United States Patent [19]
Rau et al.

[11] Patent Number: 5,181,476
[45] Date of Patent: Jan. 26, 1993

[54] EQUIPMENT SYSTEM FOR AGRICULTURAL GROUND SOIL PREPARATION

[75] Inventors: Willy Rau, Kirchheim; Wolfgang Rau, Holzmaden; Christian Taus, Kirchheim, all of Fed. Rep. of Germany

[73] Assignee: Firma Maschinenfabrik Rau GmbH, Fed. Rep. of Germany

[21] Appl. No.: 423,405
[22] PCT Filed: Mar. 3, 1988
[86] PCT No.: PCT/EP88/00158
§ 371 Date: Nov. 7, 1989
§ 102(e) Date: Nov. 7, 1989
[87] PCT Pub. No.: WO88/06399
PCT Pub. Date: Sep. 7, 1988

[30] Foreign Application Priority Data

Mar. 6, 1987 [DE] Fed. Rep. of Germany ... 8703393[U]
Sep. 3, 1987 [DE] Fed. Rep. of Germany ... 8711912[U]
Nov. 19, 1987 [DE] Fed. Rep. of Germany ... 8715345[U]

[51] Int. Cl.⁵ .............................................. A01B 49/06
[52] U.S. Cl. ........................................ 111/60; 111/52; 111/147; 111/162
[58] Field of Search .................. 111/147, 161, 162, 52, 111/60, 59, 197, 190, 158, 159, 160

[56] References Cited

U.S. PATENT DOCUMENTS 3,398,707 8/1968 McClenny ...................... 111/162 X
4,776,290 10/1988 Rau et al. ................... 111/59

FOREIGN PATENT DOCUMENTS 0161621 11/1985 European Pat. Off. .
0201785 11/1986 European Pat. Off. .
2821863 11/1979 Fed. Rep. of Germany ...... 111/162
3512658 10/1986 Fed. Rep. of Germany .
2330296 6/1977 France ................... 111/162

Primary Examiner—Dennis L. Taylor
Assistant Examiner—Jeffrey L. Thompson
Attorney, Agent, or Firm—Evenson, Wands, Edwards, Lenahan & McKeown

[57] ABSTRACT

The equipment system consists essentially of the undercarriage 101 having supporting wheels, the rotary device with dovetailing prongs 102, the sowing machine 103 and the land roller or clod breaker apparatus 104. The system components may be used in various combinations or individually.

13 Claims, 17 Drawing Sheets

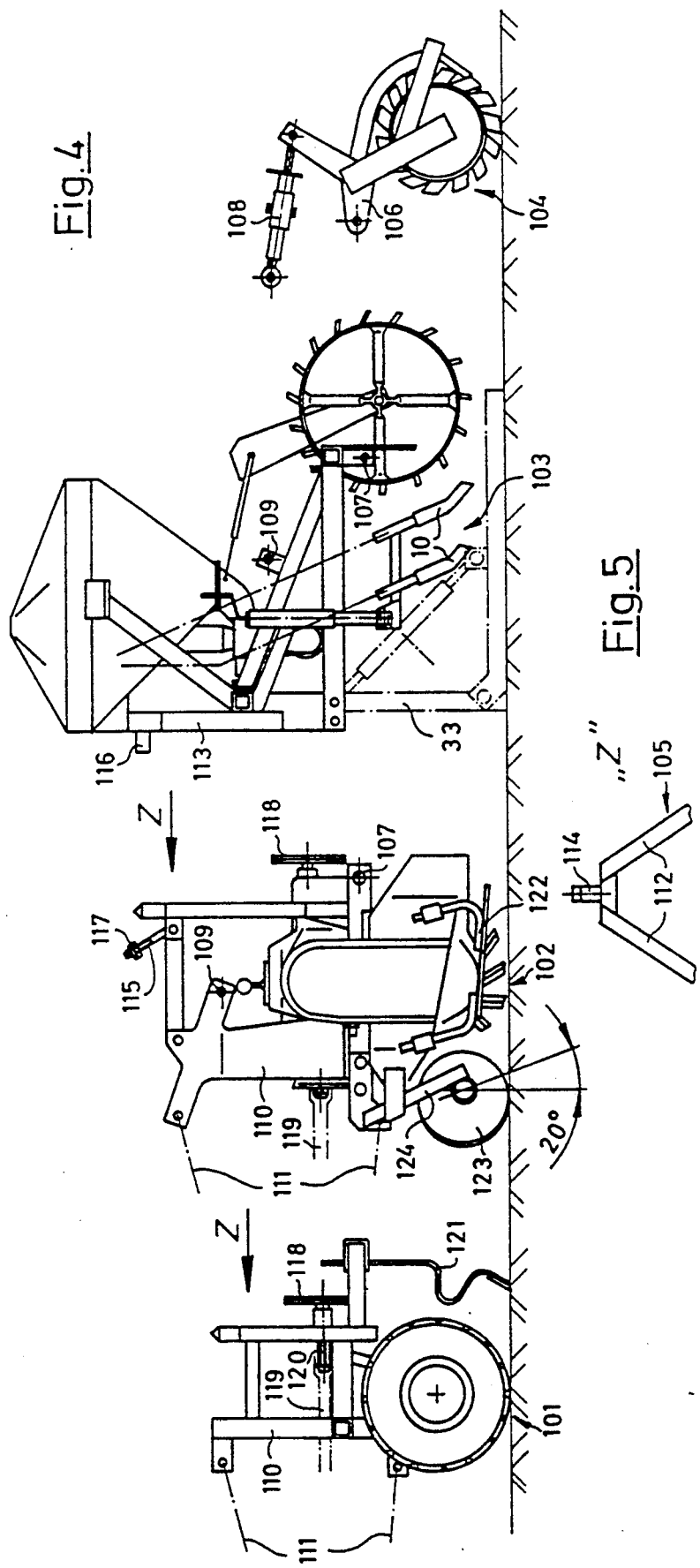

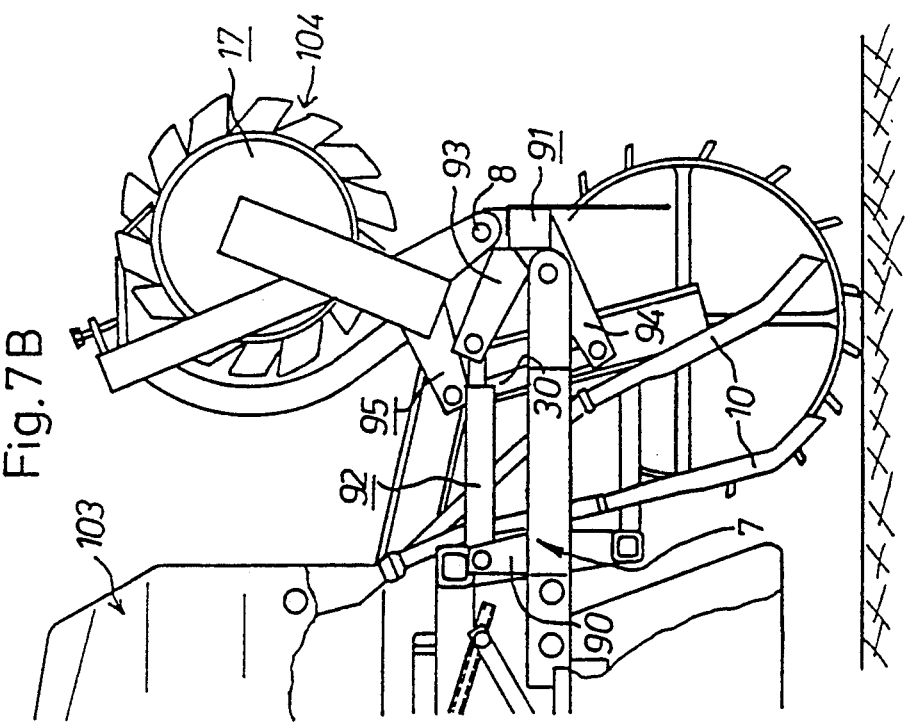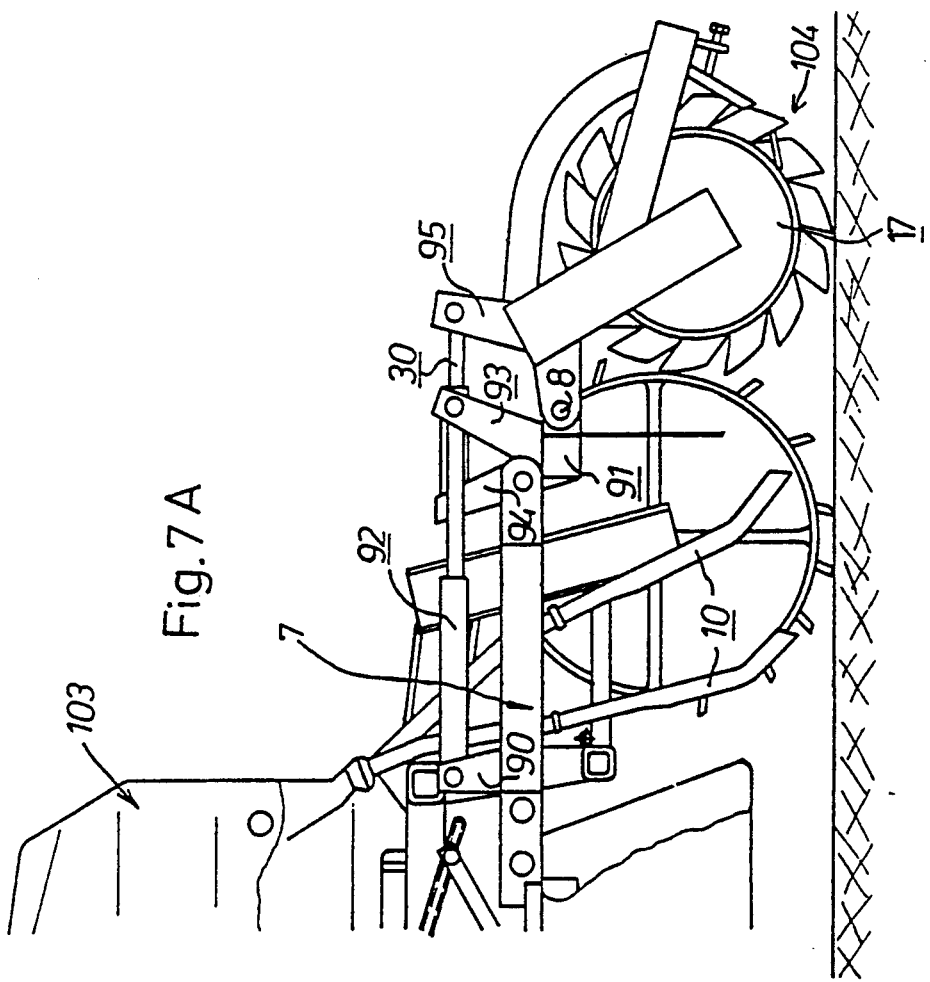

EQUIPMENT SYSTEM FOR AGRICULTURAL GROUND SOIL PREPARATION

The invention relates to an equipment system for agricultural ground soil preparation having a frame unit which, by means of a lifting rod assembly or three-point rod assembly, can be vertically adjustably coupled to a traction vehicle, such as a tractor, and is used for ground soil preparation equipment which can be combined in different ways, such as a power take-off shaft driven rotary device with dovetailing prongs or similar devices which produce a similar stream of soil which, behind the rotary device with dovetailing prongs, is guided to the ground by means of devices arranged there, and a sowing machine which has vertically adjustable seed delivery pipes which can be mounted behind the rotary device with dovetailing prongs or the like and project into the stream of soil thrown up by the rotary device with dovetailing prongs or the like, and a land roller or clod breaker apparatus and plow accessories or the like, which vertically adjustably can be mounted at the frame of the rotary device with dovetailing prongs in front of the rotor. At the frame of the rotary device with dovetailing prongs or the like, a trestle-type frame part is fixedly arranged which can be coupled to the lifting rod assembly three-point rod assembly. The land roller or clod breaker apparatus has a separate frame which, in the manner of a rocker device, pivotably adjustably around a transverse axis, can be connected to separate connecting points of the frame of the rotary device with dovetailing prongs or the like.

In principle, combination machines are known for agricultural ground soil preparation which, during a single passage over the ground to be worked or tilled, carry out several operations simultaneously.

EP-A 02 01 785, for example, describes an agricultural combination machine of the initially mentioned type.

The sowing machine of this known machine may selectively be equipped with sowing plows which operate behind the clod breaker apparatus, or with seed delivery pipes which operate within the stream of soil thrown up by the rotary device with dovetailing prongs in front of the clod breaker roller. In order to prevent in this case that the spaces between the seed delivery pipes are clogged by adhering soil or plant residues, the seed delivery pipes are arranged directly in front of the clod breaker roller, specifically in such a manner that rows of teeth arranged on the clod breaker roller project into the spaces between the seed delivery pipes. In this manner, the spaces are kept free of cloggings by means of the teeth of the clod breaker roller which move while the machine is driving. However, for this purpose, clod breaker rollers are required which have correspondingly long teeth; i.e., any arbitrary type of clod breaker rollers cannot be used.

In EP-A 02 01 785, the sowing plows are arranged in two rows behind one another, in which case, sowing plows which follow one another in transverse direction of the machine are alternately assigned to one or the other row. Such an arrangement is necessary in order to be able to achieve a relatively narrow line distance in transverse direction of the machine by means of sowing plows.

Since the sowing plows cut into the soil, they basically have the disadvantage that plant residues remaining in the soil may adhere to the sowing plows. Therefore, sowing plows are disadvantageous in cases where fairly large quantities of plant residues remain on or in the ground.

In the case of the combination machine shown in EP-A 02 01 785, the clod breaker roller also has the task of guiding to the ground the stream of soil thrown backward by the rotary device with dovetailing prongs.

Another combination machine is shown in EP-A 02 11 967.

In this case, a premounted apparatus, which carries plow accessories and is supported on the ground to be worked by means of its own wheels, can be coupled to a traction vehicle by means of a three-point rod assembly.

A second apparatus, which is constructed as a circular spike harrow can vertically movably be connected to the premounted apparatus by means of a three-point rod assembly. During the operation, the second apparatus, by means of a follower roller, is supported on the ground.

By means of another three-point rod assembly, a cart rolling on separate wheels can be connected behind the second apparatus. A follower apparatus, such as a sowing machine, which moves on its own wheels, may then vertically adjustably be connected behind this cart again by means of a three-point rod assembly.

The cart is mainly used for supporting the apparatus during the transport in the lifted position. For this purpose, the front end of the whole machine combination is lifted from the direction of the traction vehicle by means of the three-point rod assembly on the traction vehicle side. In addition, the three-point rod assemblies are hydraulically adjusted in front of and behind the cart in such a manner that the second apparatus as well as the follower apparatus are lifted.

It is now the object of the invention to provide an equipment system which can be manufactured comparatively cost-effectively and the, if necessary, also separately usable system components of which can be combined with one another with a particularly minimal amount of labor.

In the case of an equipment system of the initially mentioned type, this object is achieved according to the invention in that a trestle-type frame part, which can be coupled to the lifting rod assembly or three-point rod assembly, is fixedly arranged also at the frame of a separate undercarriage with supporting wheels, in that, on the rear side of the trestle-type frame parts of the rotary device with dovetailing prongs or the like and the undercarriage which faces away from the lifting rod assembly or three-point rod assembly, a supporting frame is arranged—as part of the trestle-type frame part or fixedly connected with it—which can be coupled with matching receiving parts of a bearing frame of the sowing machine by inserting the supporting frame from below into the receiving parts or lowering the bearing frame of the sowing machine from above on the supporting frame and locking it by means of a locking without play in all directions relative to the supporting frame, in that separate connecting points, which are identical to those on the frame of the rotary device with dovetailing prongs or the like, are arranged at the bearing frame of the sowing machine for the separate frame of the land roller or clod breaker apparatus, in that the seed delivery pipes can be mounted behind one another in at least two rows, seed delivery pipes following one another in transverse direction being assigned alternately to one or the other row, in that behind the seed delivery pipes—in front of the possibly connected land roller or clod breaker apparatus, a mat-type curtain can be transversely mounted which guides the stream of soil to the ground, and the plow accessories or the like may also be mounted at the undercarriage frame.

By means of the equipment system according to the invention, different equipment combinations may be established in a very simple manner. The possibility exists, for example, of putting together a simple sowing apparatus by arranging the sowing machine with its bearing frame on the undercarriage frame. If necessary, plow-type accessories may be arranged at the undercarriage frame for breaking open or loosening the ground surface and thus preparing it better for receiving the seed.

If necessary, this sowing apparatus may be combined with a land roller or clod breaker apparatus, because corresponding connecting points for the frame of the roller are provided at the bearing frame of the sowing machine.

At any time, the rotary device with dovetailing prongs may be used alone or in combination with plow accessories arranged at its frame which operate in front of the rotary device with dovetailing prongs.

As a result of the above-indicated special arrangement of the seed delivery pipes, large distances remain between them, through which even long-strand plant residues or the like can pass. A clogging of the spaces between the seed delivery pipes therefore does not have to be feared when the sowing machine is used without the rotary device with dovetailing prongs or when the sowing machine is used in combination with the rotary device with dovetailing prongs.

The mat-type curtain, which can be mounted behind the seed delivery pipes, particularly when the sowing machine is combined with the rotary device with dovetailing prongs, promotes the covering of the seed by guiding to the soil surface the stream of soil which is thrown backward through the spaces between the seed delivery pipes by the rotary device with dovetailing prongs.

This, at the same time, protects the land roller or clod breaker which may operate behind the seed delivery pipes; i.e., even when the work takes place in moist soil, comparatively, the roller does not become very dirty. As a result of the flexibility of the curtain, moist or clayey sticky soil will adhere to the curtain only for a short time. Because of the continuously changing movements of the curtain, the adhering soil will be detached in a very short time and guided to the soil surface; i.e., the curtain cleans itself.

In addition, reference is made to the subclaims and the following description of preferred embodiments by means of the drawing concerning advantageous and preferred characteristics of the invention.

FIG. 1 is a lateral view of the undercarriage with the supporting wheels;

FIG. 2 is a lateral view of the rotary device with dovetailing prongs;

FIG. 3 is a lateral view of the sowing machine;

FIG. 4 is a lateral view of the land roller or clod breaker;

FIG. 5 is a view of the supporting frame arranged at the undercarriage or at the frame of the rotary device with dovetailing prongs corresponding to the arrows Z in FIGS. 1 and 2;

FIG. 7 is a partial lateral view of the machine shown in FIG. 6, in which the land roller or clod breaker is once shown in the operating position (FIG. 7A) and a second time in a folded-up transport position (FIG. 7B);

Figure 6:
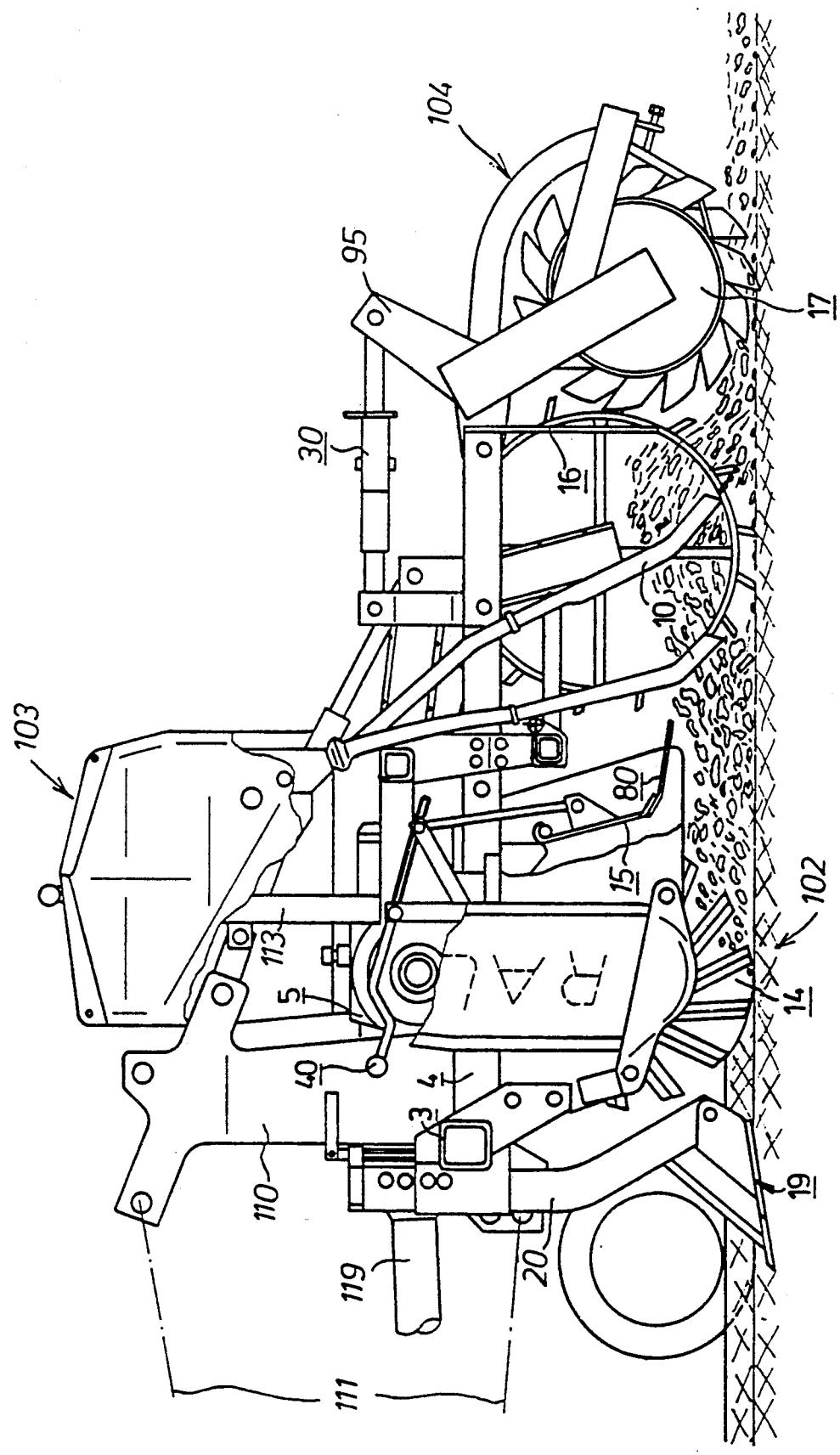
FIG. 6 is a lateral view of an equipment combination having, among other things, a rotary device with dovetailing prongs, a sowing machine, a land roller and clod breaker as well as plow accessories arranged in front of the rotary device with dovetailing prongs.

A particularly preferred embodiment of the equipment system according to the invention shown in FIGS. 1 to 5 comprises the undercarriage 101 shown in FIG. 1, the rotary device with dovetailing prongs 102 shown in FIG. 2, the sowing machine shown in FIG. 3 as well as the land roller or clod breaker apparatus 104 shown in FIG. 4.

In a manner shown further below, the sowing machine 103 can be mounted on the undercarriage 101 as well as on the rotary device with dovetailing prongs 102 without much labor, so that the sowing machine 103 can be carried by the undercarriage 101 or by the rotary device with dovetailing prongs 102. In this case, the sowing machine 103 is held without play on the supporting frame 105 (compare also FIG. 5) of the undercarriage 101 or the rotary device with dovetailing prongs 102

The land roller or clod breaker apparatus 104 may be mounted selectively directly at the rotary device with dovetailing prongs 102 or at the frame of the sowing machine 103. The arrangement at the sowing machine 103 is possible whether the sowing machine 103 is mounted on the undercarriage 101 or on the rotary device with dovetailing prongs 102.

If necessary, the land roller or clod breaker apparatus 104 may also be arranged at the frame of the undercarriage 101, if its wheels or the axle arrangement bearing the wheels are dismounted.

The land roller or clod breaker apparatus 104 is, in each case, coupled in the manner of a rocker device, in that shacke-toggle joint type clips 106 arranged at the frame of the land roller or clod breaker apparatus 104, in the manner of hinges by means of bolts, are fastened to connecting parts 107 at the frame of the sowing machine 103 or of the rotary device with dovetailing prongs 102. The adjustment of the height of the land roller or clod breaker apparatus 104 relative to the apparatus arranged in front of it takes place by means of a supporting aggregate 108 which, on one side, is coupled to an upwardly-directed arm of the frame of the land roller or clod breaker apparatus 104 and, on the other side, can be pivotally fastened to connecting points 109 at the frame of the sowing machine 103 or of the rotary device with dovetailing prongs 102.

The undercarriage 101 as well as the rotary device with dovetailing prongs 102 have a trestle-type frame part 110 which, in the case of the rotary device with the dovetailing prongs 102, has a particularly stable construction in view of the high weight of the device and its considerable stressing during ground soil preparation. At the trestle-type frame part 110, lower connecting Points are provided in each case for two lower links and upper connecting points for one upper link of a three-point rod assembly 111 arranged at a traction vehicle or tractor, in order to be able to hold the undercarriage 101 or the rotary device with dovetailing prongs 102 directly at the traction vehicle or tractor. By means of the three-point rod assembly 111, the coupled device can be held vertically adjustably relative to the traction vehicle or tractor, which, as a rule, is necessary, for soil preparation work. In addition, the three-point rod assembly 111 offers the possibility of lifting the coupled device or hold it at a given height relative to the traction vehicle or tractor.

Figure 19:
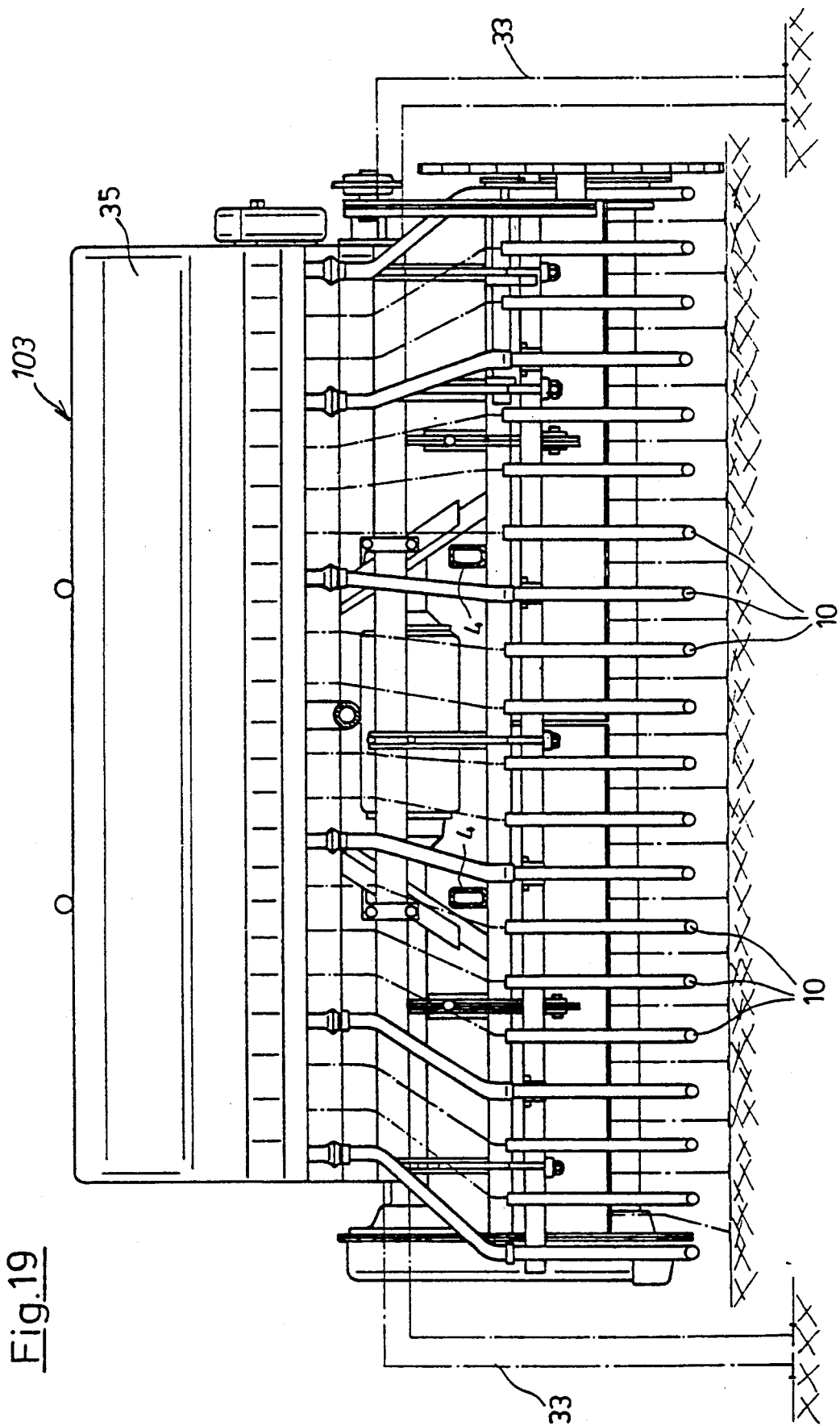
FIG. 19 is a rear view of the sowing machine.

The possibility of lifting the coupled device, i.e., moving it vertically relative to the traction vehicle or tractor, is utilized when the sowing machine 103 is mounted on the undercarriage 101 or the rotary device with dovetailing prongs 102. When the sowing machine 103 is not used, it may be parked by means of supports 33 which can be mounted at a transverse bar of the sowing machine frame and, together with the frame, form a gantry; compare also FIG. 19. Now, the undercarriage 101 or the rotary device with dovetailing prongs 102, after the coupling with the three-point rod assembly 111, is moved into a position in which the supporting frame 105 is in a position in which the slanted members 112 of the supporting frame 105 take up a position below correspondingly slantedly arranged receiving parts 113 at the sowing machine frame. The receiving parts 113 may, for example, be constructed as U-profiles into which the slanted members 112 of the supporting frame 105 can be pushed by means of the lifting of the undercarriage 101 or of the rotary device 102 with dovetailing prongs 102 by means of the three-point rod assembly 111. This pushing-in movement may be facilitated by the fact that the supports 33, as shown in FIG. 3, can be adjusted in their slope. In addition, an upwardly directed guide rod 114 may be arranged at the supporting frame 105, the free upper end of which, in the lateral view shown in FIGS. 1 and 2, is constructed in the manner of a roof and interacts with guide plates arranged between the receiving parts 113 of the sowing machine frame in order to simplify the pushing-in of the supporting frame 105 into the receiving parts. As soon as the receiving parts 113 lie firmly on the slanted members 112 of the supporting frame 105, the position of the sowing machine on the supporting frame 105 is secured so that it is immovable. For this purpose, a threaded part 115 is used, for example, which according to FIG. 2, is pivotably fastened to the supporting frame 105 and which, when the sowing machine frame sits on the supporting frame 105, can be folded into a U-shaped recess, which is open toward the front, at an extension 116 of the sowing machine frame. Then, a nut 117, which can be screwably adjusted on the threaded part 115, is braced against the top side of the mentioned extension 116, in order to clamp the sowing machine frame or its receiving parts 113 without play onto the slanted members 112 of the supporting frame 105.

The coupling of the land roller or clod breaker apparatus 104 to the rotary device with dovetailing prongs 102 or the sowing machine 103 is also considerably facilitated by the lifting adjustability of the three-point rod assembly 111. By means of a corresponding moving of the traction vehicle or tractor as well as by means of the lifting adjustment of the coupled apparatus, the connecting parts 107 may be brought into a position in which they can be connected without any difficulty with the brackets 106 of the frame of the land roller or clod breaker apparatus 104.

The undercarriage 101 shown in FIG. 1 has a special characteristic in that a pulley 118 or the like is rotatably disposed on the undercarriage frame and can be driven by the traction vehicle or the tractor by means of a power take-off shaft 119 which, in turn, may be coupled with a toothed end 120 of the pulley shaft. This provides a simple possibility of driving, if required, a sowing machine mounted on the undercarriage 101 by means of the power take-off shaft 119. This is particularly important if so-called pneumatic sowing machines are to be used, in which the seed must be conveyed into the seed delivery pipes or the like of the sowing machine by means of a blower to be driven by the power take-off shaft 119.

In addition, plow-accessory type spring prongs 121 may be arranged at the undercarriage 101 which prepare the soil for the sowing of the seed by means of the sowing machine 103 which can be mounted on the undercarriage 101.

However, in principle, the spring prongs 121 may also be arranged at the frame of the sowing machine 103.

Figure 23:
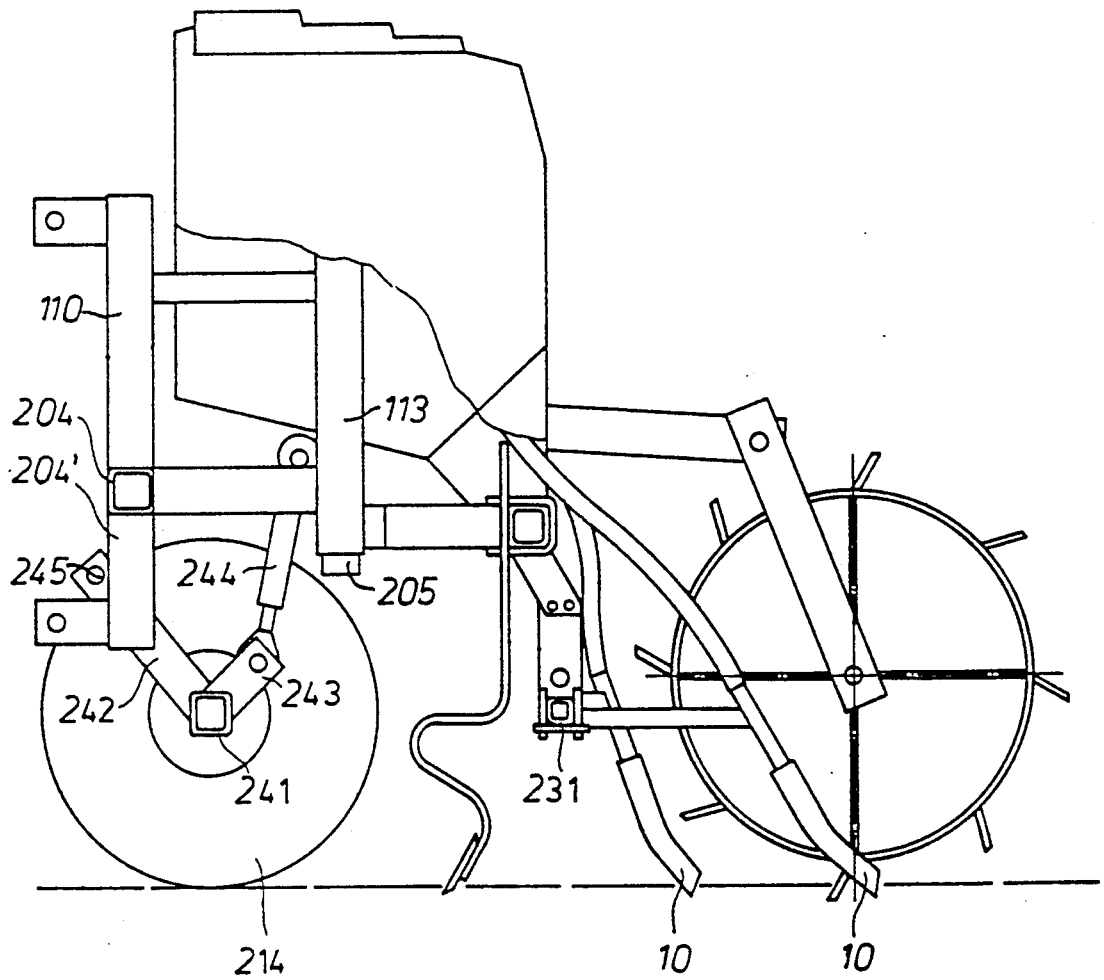
FIG. 23 is a lateral view of the undercarriage having supporting wheels and with a sowing machine mounted on the undercarriage frame.
Figure 24:
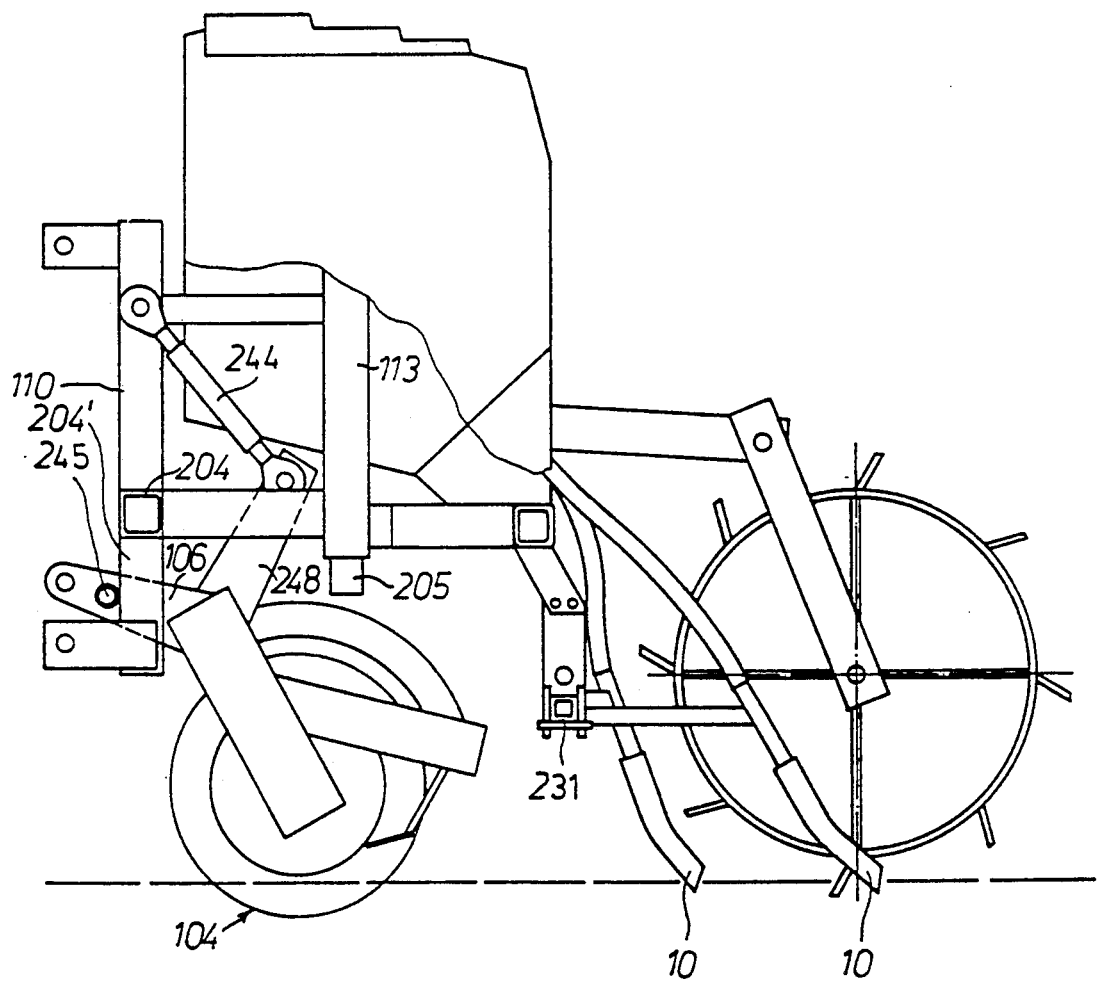
FIG. 24 is a lateral view corresponding to FIG. 23 of a sowing machine mounted on the undercarriage frame, in which case, however, instead of the supporting wheels, a land roller is arranged at the undercarriage frame.

According to FIGS. 23 and 24, transverse bars 204 and 205 of the undercarriage 101 may be arranged at a particularly large distance from the ground. In this case, the front transverse bar 104 forms a gantry in frontal view of the machine, in that downwardly directed end pieces 204' are arranged at the lateral ends of the transverse bar 204. An axle unit for the wheels 214 may be held between the end pieces 204'.

The axle unit consists essentially of an axle 241 which, for example, is formed by a sturdy tube, and carries the wheels 214 and, by means of longitudinal control arms 242 which are rigidly arranged at it, is coupled to the end pieces 204' of the front transverse bar 204 while being able to be swivelled around a transverse axis. For the hinged connection between the end pieces 204' and the longitudinal control arms 242, pins 245 are used, for example, which penetrate aligned bores at the end pieces 204' as well as the longitudinal control arms 242. In addition, an arm 243, which is directed slantedly upward and toward the rear, is fixedly arranged at the axle 241, approximately in its central area, this arm 243 being hinged to one end of a spindle 244, the other end of which is hinged to a part of the undercarriage frame, for example, to the rear transverse bar 205. By a changing of the length of the spindle 244, the position of the axle 241 may be changed in vertical direction.

According to FIG. 24, the land roller or clod breaker apparatus 104, in principle, may be connected with the frame of the undercarriage 101 in the same manner as the axle unit.

For the coupling to an apparatus moving in front of it, the frame of the land roller or clod breaker apparatus 104 has brackets or longitudinal control arms 106 which, in the same manner as the longitudinal control arms 242 of the axle unit (compare FIG. 23), can be hinged to the end pieces 204' of the front transverse bar 204, so that the frame of the land roller or clod breaker apparatus 104 can swivel relative to the frame of the undercarriage 101 around a transverse axis formed by the pins 245. Between an arm 248 arranged at the frame of the land roller or clod breaker apparatus and a part of the frame of the undercarriage 101, for example, the trestle-type frame part 110, a spindle 244 is arranged, in turn, the dimension of the length of which determines the position of the roller relative to the undercarriage frame in vertical direction.

In the case of the rotary device with dovetailing prongs 102, the trestle-type frame part 10, as in the case of the rotary device with dovetailing prongs 110 shown in FIG. 6, is arranged as part of a bearing frame which carries the rotary device with dovetailing prongs 14 and, at the front side of the device, has a sturdy transverse bar 3 as well as short longitudinal bars 4. In this case, the lateral parts of the rotor housing which carry the ends of the rotor shaft are supported at the transverse bar 3 as well as at a tube arranged in transverse direction of the device, this tube being connected with the longitudinal bars 4 and being arranged as a jointly carrying part, on both sides of a housing 5 for a transmission of the rotary device with dovetailing prongs 14 which is located in the space between the longitudinal bars 4 and the trestle-type frame part 110. For the drive of the rotary device with dovetailing prongs 14, a takeoff shaft 119 is used which can be connected with a transmission connection of the traction vehicle or tractor and drives the transmission housed in the housing 5. This transmission, in turn, by means of a shaft housed in the above-mentioned tube, is in driving connection with transmission elements in one side part of the rotary device with dovetailing prongs 102 and thus with the rotor shaft.

In addition, the transmission housed in the housing 5 has another transmission output for driving of a pulley 118 or the like arranged there, which makes it possible, for example, to drive a pneumatic sowing machine or the like mounted on the rotary device with dovetailing prongs 102, as described above in connection with the undercarriage 101.

According to FIG. 2, runners 122 may be arranged at the lateral parts of the rotor housing in which the ends of the rotor shaft are disposed, these runners 122 preventing a direct ground contact of the lateral parts. In order to avoid an adhering of long-strand plant residues or the like to the runners 122, feeding disks 123 are rotatably arranged in front of the runners 122 which, in top view of the device 102, form a funnel which is open in driving direction and correspondingly during soil work, push soil and plant residues located on the ground surface out of the area in front of the runners 122 into the operating range of the rotor 14. The stems 124 holding the feeding disks 123 are vertically adjustably arranged at the transverse bar 3. In order to make possible that the feeding disks 123 operate directly in front of the runners 122, and thus particularly effectively keep the runners free of plant strands and the like, the stems 124 are arranged slantedly in the manner shown in FIG. 2.

The rotary device with dovetailing prongs 14 is driven in a circumferential direction which supports the driving direction of the device; i.e., in FIGS. 2 and 6 in a counterclockwise rotating direction.

On its top side, the rotary device with dovetailing prongs 14 is covered in the manner of a housing, in which case the covering continues toward the rear as a flap 15 which can be swivelled around a transverse axis (compare FIG. 6), the position of which can be adjusted by means of cranks 40 or the like. As a result, the stream of soil which is generated and thrown in backward direction by the rotary device with dovetailing prongs 14 can be limited in upward direction.

In order to, in addition, reduce the scattering of the stream of soil in upward direction, a flexible mat 80 may be arranged at the free edge of the flap 15, the dimensions of which, with respect to the size, correspond to the dimensions of the flap 15. In this case, the stiffness of the mat 80 is approximately such that the mat 80 is brought into an approximately horizontal position by the stream of soil which is thrown toward the rear by the rotary device with dovetailing prongs 14. As the result of the arrangement of the mat 80, a stream of soil is generated which in upward direction is limited by a boundary layer with a small cross-section. As a result of the flexibility of the mat, this mat continuously carries out more or less pronounced fluttering and flexing movements which prevent soil from adhering to the mat 80. As a result of the arrangement of the mat 80, the stream of soil generated by the rotary device with dovetailing prongs 14 covers the seed particularly evenly which, by means of seed delivery pipes 10 of the sowing machine 103 arranged behind the rotary device with dovetailing prongs 14, can be placed in or under the the stream of soil generated by the rotary device with dovetailing prongs 14.

As a deviation from the apparatuses shown in FIGS. 2 to 4, in which the land roller or clod breaker apparatus 104, in the case of a combination of the rotary device with dovetailing prongs 102 with the sowing machine 103, is arranged at the frame of the sowing machine 103, it is provided in the embodiments according to FIGS. 6 and 7 to connect the land roller or clod breaker apparatus 104 with the frame of the rotary device with dovetailing prongs 102.

For this purpose, an intermediate frame 7 connects to the longitudinal bars 4 of the frame carrying the rotary device with dovetailing prongs 14, this intermediate frame 7, in turn, being connected with the frame of the land roller or clod breaker apparatus 104.

The intermediate frame 7 may form or carry a platform made of gridirons or the like which is used as a standing base for the equipment user when the seed container 35 of the sowing machine 103 mounted on the rotary device with dovetailing prongs 102 is to be inspected or filled.

At the edge of the platform or of the intermediate frame 7 on the side of the roller, a curtain 16 is arranged which prevents that the stream of soil thrown up by the rotary device with dovetailing prongs 14 can impact directly on the roller 17. The rear side of the curtain 16 facing the roller also has a glaring color, for example, in the form of a red-and-white striped pattern. In rear view of the apparatus, this rear side becomes completely visible when the land roller or clod breaker apparatus 104 is swivelled from the operative position shown in FIG. 6 to a transport position above the intermediate frame 7 (compare FIG. 7). Thus, traffic which follows is caused to pay more attention during the transport of the apparatus.

In the case of equipment with a very large operating width, it is normally, for reasons of stability, not sufficient for the frame of the land roller or clod breaker apparatus 104 to be held only at an intermediate frame 7 extending the longitudinal bars 4. In this case, on the top side of the rotor housing, additional longitudinal bars are arranged close to the exterior sides of the apparatus which are spaced away from the longitudinal bars 4. Here, the front ends of these additional longitudinal bars may be connected with the transverse bar 3. In addition, the exterior sides of the rotor housing or the additional longitudinal bars are also supported with respect to the upper area of the trestle-type frame part 110 by means of rods which are not shown.

For the holding arrangement, which can be swivelled upward, of the land roller or clod breaker apparatus 104, a transverse bar 91 is disposed, pivotably around a transverse axis of the apparatus, at the rear ends of the bars of the intermediate frame 7, which extend the longitudinal bars 4 or at the rear ends of the additional longitudinal bars. For the swivelling of the transverse bar 91, essentially horizontally arranged piston-cylinder units 92 are used which are coupled above the intermediate frame 7 or the additional longitudinal bars, to holding arms 90 fixed at the frame and, on the other side, are coupled to crank arms 93 which are non-rotatably connected with the transverse bar 91. By means of the corresponding actuating of the piston-cylinder units 92, the transverse bar 91 may be swivelled between the end positions shown in FIG. 7.

The frame of the land roller or clod breaker apparatus 104 is, pivotably around an additional transverse shaft 8, arranged at the transverse bar 91. For supporting the frame of the land roller or clod breaker apparatus 104 with respect to the transverse bar 91, a supporting arrangement 30 is used which is arranged between a holding arm 94 arranged at the transverse bar 91 approximately in its center and a corresponding holding arm 95 arranged at the frame of the land roller or clod breaker apparatus 104. The supporting arrangement 30 is normally stressed by pressure because the roller 17 supports the apparatus when the soil is worked. However, the supporting arrangement 30 has a certain play which makes it possible for the equipment parts in front of the roller to escape in upward direction when ground obstacles or the like are encountered, without the requirement of having to also lift the roller 17 at the same time. In this case, the supporting arrangement 30 may be extended by an extent indicated by the play.

The supporting arrangement 30 is constructed in the manner of a telescope, in which case the whole, preferably adjustable clearance of motion permits the parts which can be telescoped to perform relative movements with respect to one another. Inside the supporting arrangement 30, an additional piston-cylinder unit may be arranged which has the purpose of shortening the supporting arrangement 30 as much as possible when the transverse bar 91 is swivelled for the folding-up of the land roller or clod breaker apparatus 104. As a result, the elements of the supporting arrangement 30 are held braced with respect to one another without play, and it is ensured at the same time that the roller 17, in the swivelled-up position, is shifted toward the front as far as possible. Correspondingly, the center of gravity of the whole apparatus also shifts toward the front. This is important when the whole apparatus, by means of the lifting rod assembly or three-point rod assembly 111, is coupled to a comparatively light traction vehicle and must be lifted from the operating position, into a lifted-out position, particular for the transport. Since the center of gravity of the whole apparatus, when the roller is folded-up, shifts toward the vehicle, the total weight of the apparatus, relative to the vehicle, has a comparatively short lever arm effect. As a result, the front axle of the traction vehicle or tractor is less extensively relieved from load when the apparatus is lifted.

Figure 12:
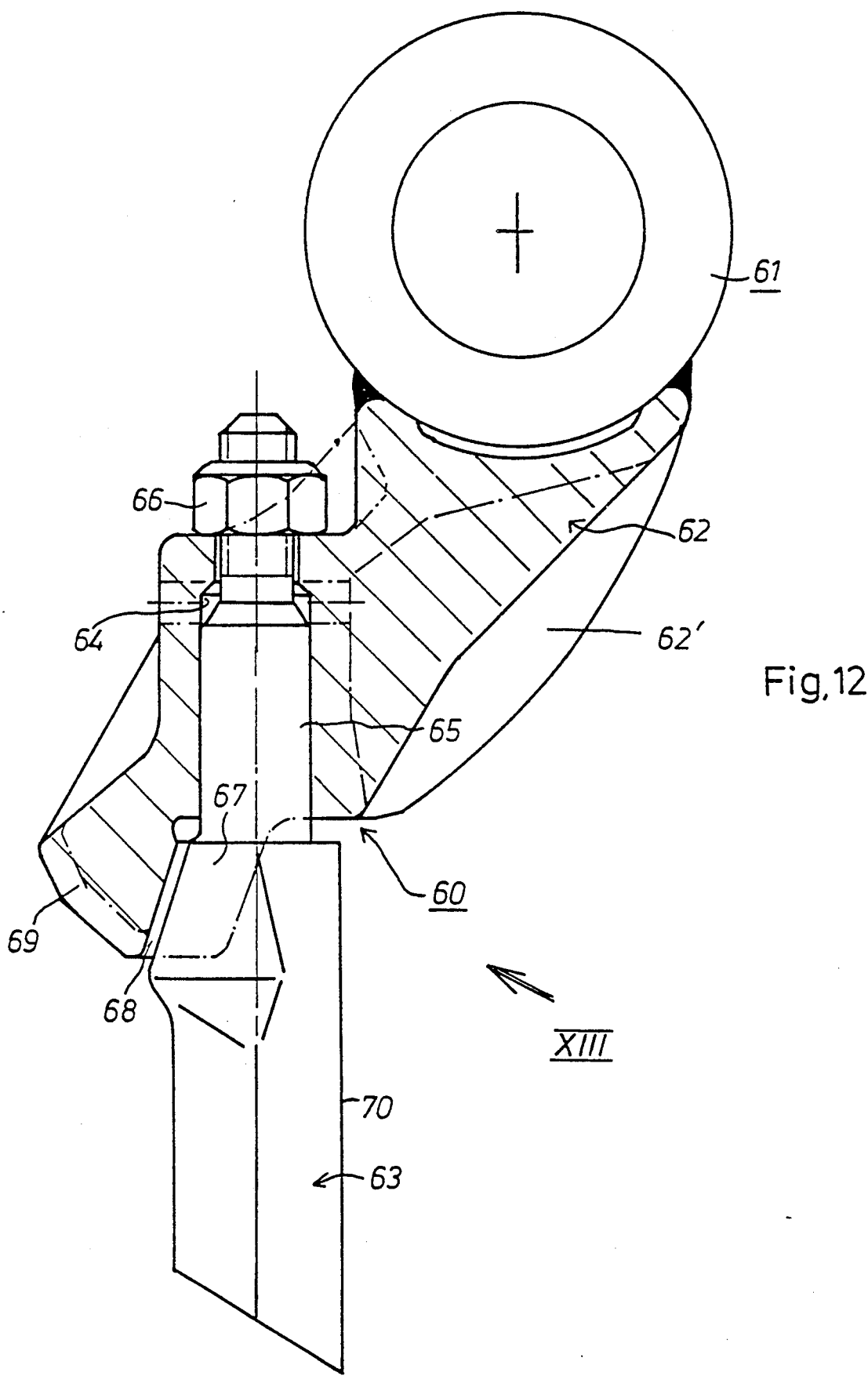
FIG. 12 is a view of a rotor prong in axial direction of the rotary device with dovetailing prongs.
Figure 13:
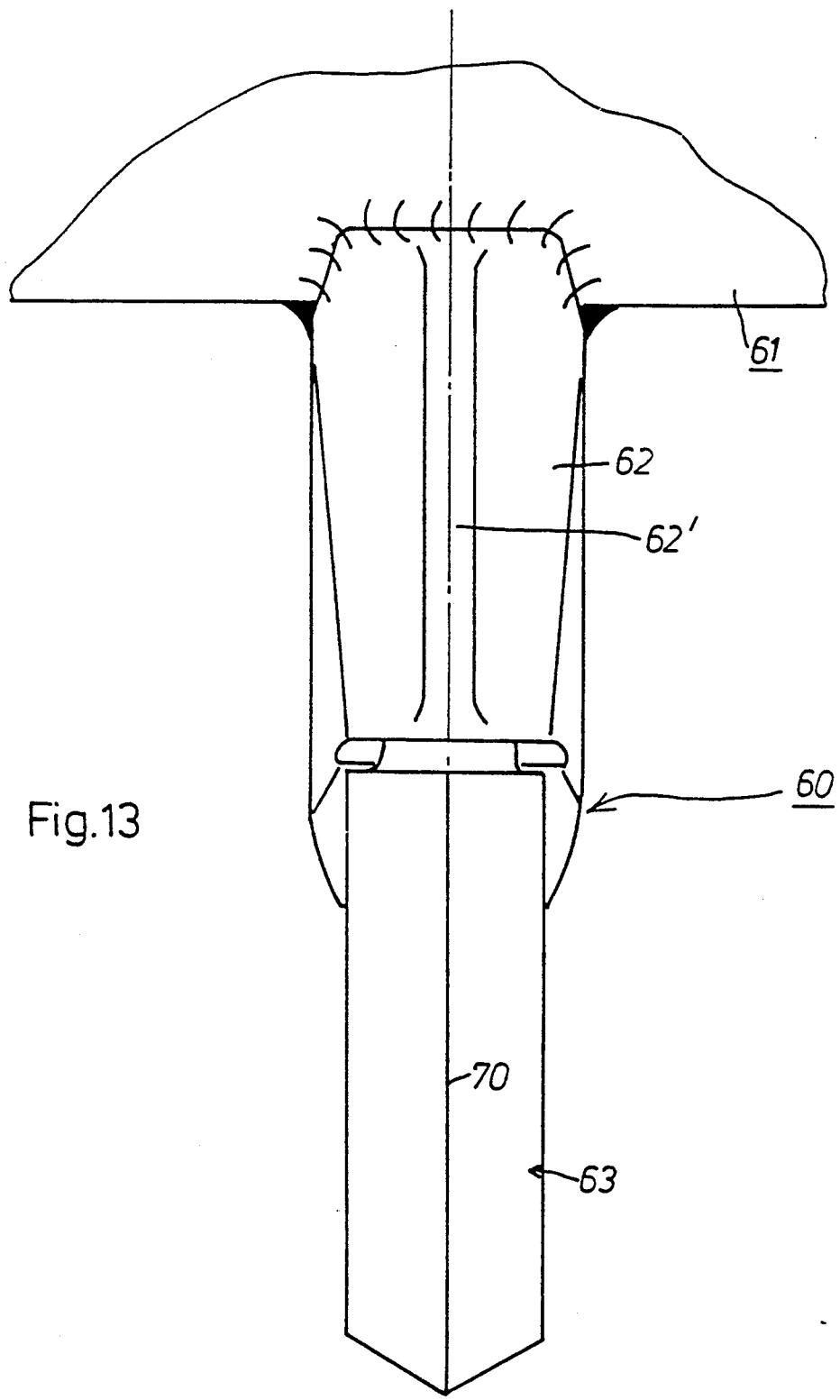
FIG. 13 is a view of the rotary device with dovetailing prongs corresponding to arrow XIII in FIG. 12.

The prongs 60 of the rotor, corresponding to FIGS. 12 and 13, have a holding arm 62 welded to the rotor shaft 61, which, as a forged part, with respect to its functional design, is constructed such that the central rib 62' of the holding arm 62 has a soil-separating effect and continues the wedge edge 70 of a prong end piece 63 exchangeably held at the holding arm 62 all the way to the rotor shaft 61. The prong end piece 63 and the holding arm 62 form an obtuse angle, which is open in rotating direction, in such a manner that the longitudinal axis of the prong end Piece 63 extends at a radial distance from the axis of the rotor shaft 61 and tangentially to it. For the holding of the prong end piece 63 at the holding arm 62, a bore 64 is used which is arranged in it and into which the prong end piece 62 can be inserted with a journal-shaped insert part 65. The insert part 65 has an end section provided with a thread onto which a nut 66 is screwed in order to hold the insert part 65, in the manner shown in FIG. 12, in the bore 64 or at the holding arm.

If necessary, the nut 66 may also form the head of a screw which can be screwed into a threaded bore in the insert part 65.

By means of the corresponding tightening of the nut 66, the slanted surfaces 67 and 68 are braced with respect to one another in the manner of a wedge. The slanted surfaces 67, following the insert part 65, are arranged prismatically with respect to one another, at the prong end piece 63, on its side pointing against the rotating direction. The corresponding slanted countersurfaces 68 are located on an enlargement 69 which, for supporting the zink end piece 63, on its side which points against the rotating direction, is molded to the holding arm 62. Because of the mentioned slanted surfaces 67 and 68, it may be easily be achieved despite manufacturing tolerances, that the prong end pieces 63 firmly rest against the enlargement and are therefore well supported. For this purpose, only the nut 66 must be tightened correspondingly. In addition, the prong end piece 63, because of the resistance generated by the soil, during ground preparation work, also tries to push itself into the receiving bore 64, in which case the slanted surfaces 67 and 68 are pressed on one another with a correspondingly increased force.

The area of the prong end piece 63 which engages in the ground has an essentially rhombically square cross-section, such that a striking or wedging edge 70 is formed which points in rotating direction. Thus, the prong 60 can throw gripped soil toward the rear and toward the side while firm soil clods and plant residues and the like are destroyed and crushed. In this case, the rotor operates at a relatively high rotational speed. As a result of the high rotational speed, the advantage is also achieved that the rotor may be equipped with comparatively few prongs. Specifically, it is sufficient for only one prong 60 to be arranged for each stroke plane of the rotary device with dovetailing prongs. In addition to ensuring a good performance, this results in the advantage that the rotary device with dovetailing prongs cannot become clogged.

Figure 15:
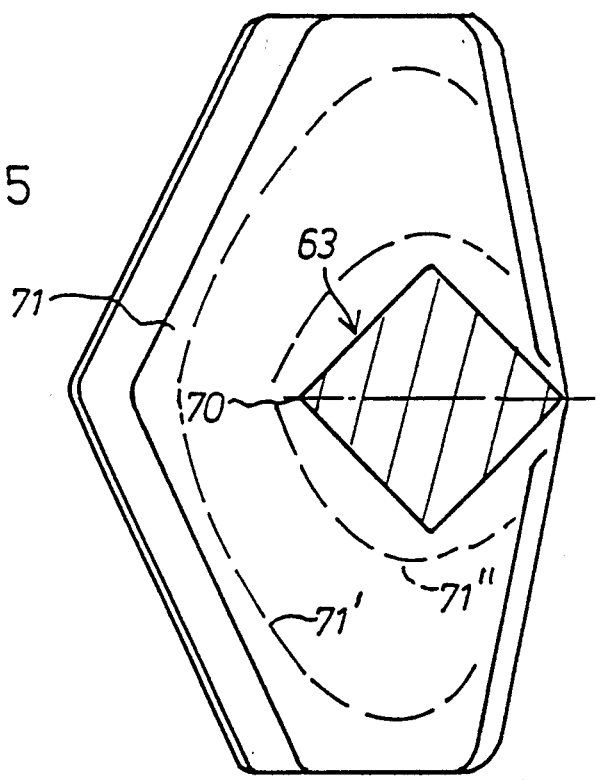
FIG. 15 is a sectional view of the mulching prong corresponding to the intersecting line XV—XV in FIG. 14.
Figure 14:
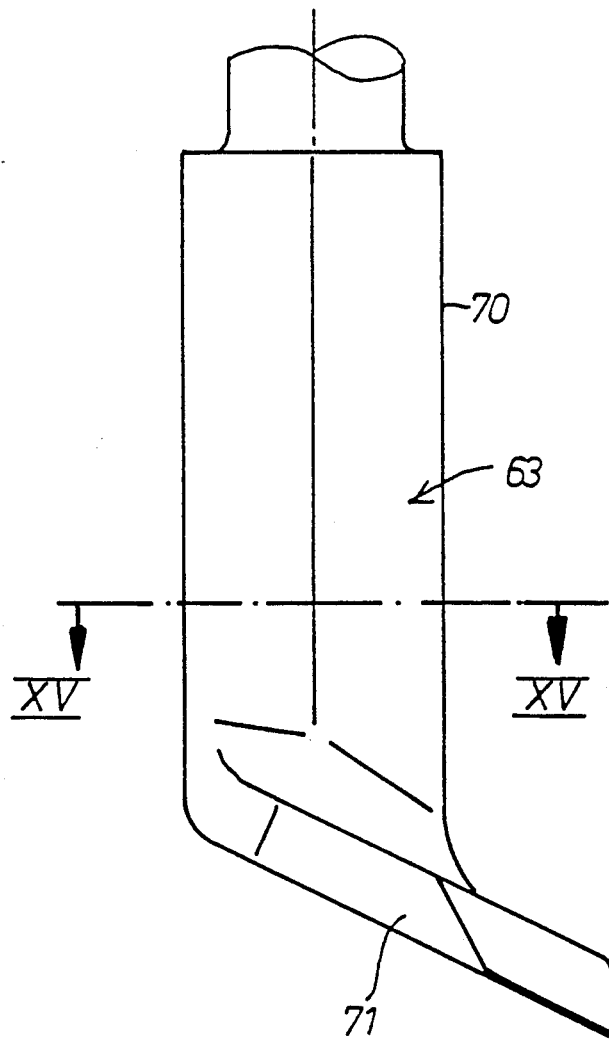
FIG. 14 is a lateral view of a prong end piece of the rotary device with dovetailing prongs used as a mulching prong viewed in axial direction of the rotary device with dovetailing prongs.

According to FIGS. 14 and 15, plow-type blades 71 may be arranged at the free ends of the prong end pieces, in order to further improve the mulching effect of the prongs. In this case, each plow-type blade 71 is aligned in such a manner that, in axial view of the rotary device with dovetailing blades, together with a radial line leading from the axis of the rotor shaft 61 to the connecting area between the prong end piece 63 and the plow-type blade 71, it forms an obtuse angle which is open in rotating direction. Correspondingly, the plow-type blade 71 seeks to lift up the gripped soil in the direction of the rotor shaft when in penetrates into the ground (so-called first-cutting effect), so that no smudging traces can be left in the ground.

A special characteristic of the plow-type blades 71 is the fact that the backswept front edge of each plow-type blade 71 pointing in rotating direction is arranged at a relatively large distance in front of the striking or wedging edge 70 of the prong end piece 63, whereas the edge of the plow-type blade 71, which points against the rotating direction and which is backswept slightly in backward direction, is located in approximately the same plane as the side of the prong end piece 63 pointing against the rotating direction, compare FIG. 15. This shape and this arrangement of the plow-type blade 71 are advantageous in that the plow-type blade 71, as a result of wear during soil work, is reduced in size relatively uniformly corresponding to the interrupted lines 71' and 71'', without the formation of thorn-type areas with a narrow cross-section which project sideways or backwards from the prong end piece 63. Thorn-type parts of this type, as a result of further wear, may break off and remain on the respective worked field. During the soil preparation which follows, there will then be the danger that these metal parts may be thrown up by the respective soil cultivating machine and, under certain circumstances, may be a danger to people.

Therefore, this danger does not exist in the arrangement and shape of the plow-type blade 71 according to the invention. In contrast, this blade 71 will be reduced only to the cross-section of the prong end piece 63 as a result of increasing wear.

Also when the prong end pieces shown in FIGS. 14 and 15 are used, the rotary device with dovetailing prongs 14 preferably has only relatively few prongs, particularly again only one prong for each stroke plane, and is driven at a relatively high speed. This results in a total detaching of any ground growth. At the same time, the ground is gripped and worked without causing smudging traces, specifically with a very good mixing. On the other hand, as a result of the very high striking speed, a particularly good cutting or crushing effect is achieved. This has the result that the gripped soil, while producing a relatively "transparent" stream of soil which consists of very small particles, is thrown backward at a high speed.

Figure 17:
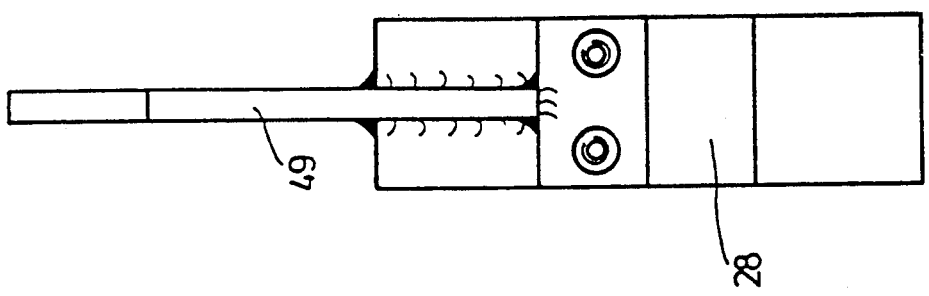
FIG. 17 is a view of the intermediate bearing corresponding to arrow XVII in FIG. 16.
Figure 16:
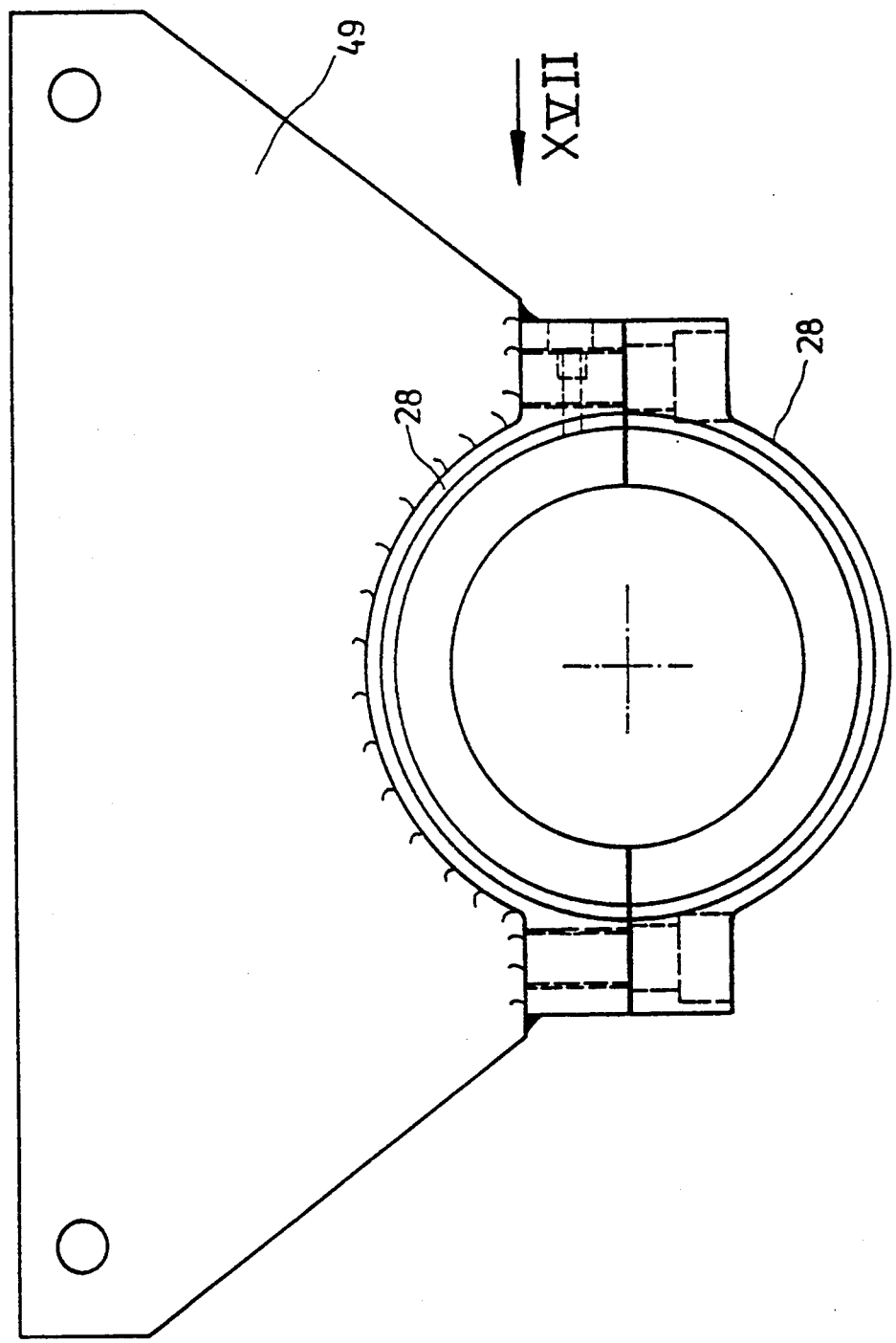
FIG. 16 is an axial view of an intermediate bearing of the rotary device with dovetailing prongs.
Figure 18:
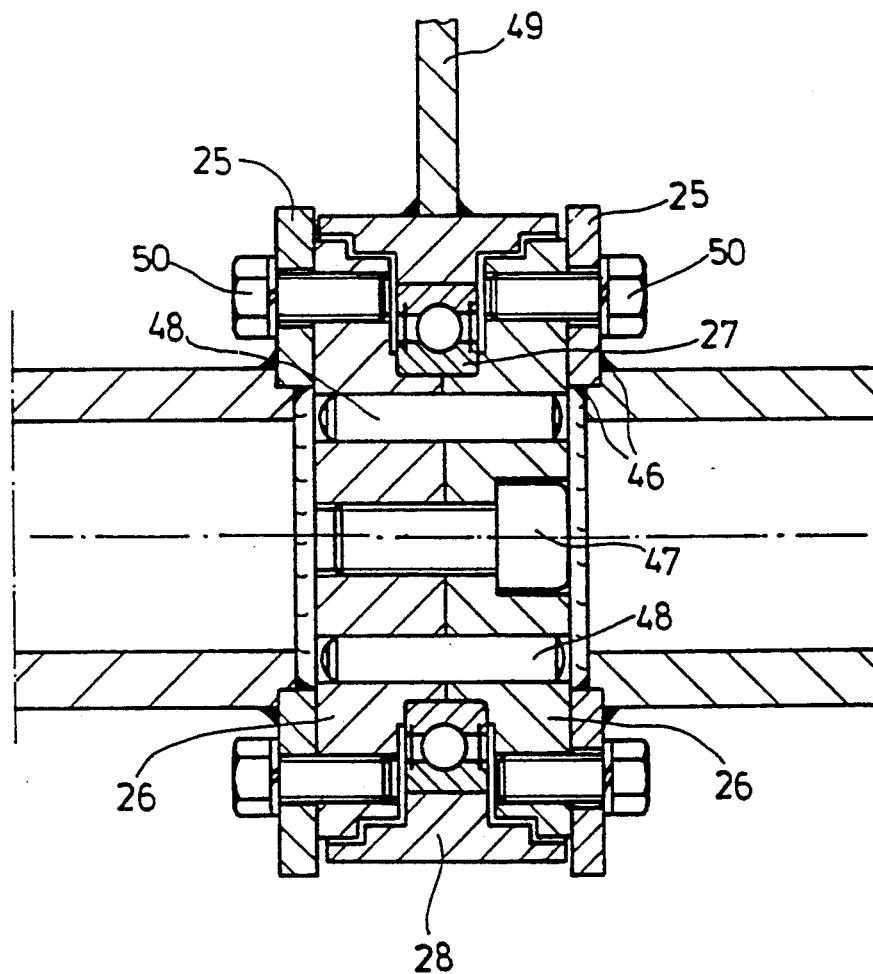
FIG. 18 is an axial sectional view of the intermediate bearing.

In the case of very wide machines, it may be advantageous to arrange the rotary device with dovetailing prongs 14 with several sections, which can be axially connected with one another and to, in each case, provide one intermediate bearing between the sections. In this case, on the one hand, a high bearing capacity of the bearing is desirable while, on the other hand, this bearing should have small axial dimensions, because otherwise there is the danger of damage to the bearing, or relatively large axial distances between the rotor prongs on both sides of the intermediate bearing would have to be accepted. FIGS. 16 to 18 show a particularly narrowly constructed intermediate bearing of a high bearing capacity.

Ring-disk-shaped flanges 25 are welded to the ends of the rotor shaft sections, in which case, preferably two welding seams are provided, one being inside the ring opening of the flanges 25 receiving the rotor shaft and the other being at the front edge of the mentioned ring opening on the side of the shaft.

Two mutually connected circular disks 26 are coaxially arranged between the flanges. The circular disks 26, on one side, are connected by means of a central screw 47 and, on the other side, by means of bolts 28 which are received in bores of the circular disks 26 arranged in a ring-shape with respect to the screw 47. If necessary, the bolts 48 may be fastened in the pertaining bores of the circular disks by a slight heating of the circular disks 26 before the bolts 48 are inserted, in order to slightly widen the bores receiving the bolts 48. Then the bolts 48, which fit into the widened bores, are inserted and are held with high force during the subsequent cooling of the circular disks 26.

At the outer circumference, the circular disks 26 commonly delimit a circumferential groove having a cross-section which widens in a step shape radially toward the outside. Inside the deep central area of this groove, a radial bearing 27 completely with its outer and inner bearing shell is housed, which in the example according to FIG. 18 is a ball bearing. If necessary, a roller bearing may also be used advantageously instead of the ball bearing. The arrangement of the radial bearing 27 naturally takes place before the connecting of the circular disks 26 with one another. At a vertical longitudinal web 49, which is arranged in the housing of the rotary device with dovetailing prongs 14 or forms part of the frame of the rotary device with dovetailing prongs 14, a separable holding part 28 is arranged which encloses the outer bearing shell of the radial bearing 27 in a ring shape and one half of which is welded to the longitudinal web 49, and the other half of which, in the manner shown in FIG. 16, can be connected by means of screws at the longitudinal web 49 or at the half of the holding part 28 which is welded to the longitudinal web 49. The holding part 28 has a cross-section which is adapted to the circumferential groove of the circular disks 26 on both sides of the radial bearing 27 in such a manner that a labyrinth-type stepped ring gap remains open between the holding part 28 and the edges of the circular disks 26.

The radial bearing 27 may be provided with a permanent lubrication in the form of a lubricating-grease packing. If necessary, the lubricant filling may also be renewed during an occasional demounting of sections of the rotary device with dovetailing prongs. The connecting screws 50, which are shown only schematically and by means of which the flanges 25 of the rotor sections are fastened to the circular disks 26, may be screwed to the circular disks 26 in threaded bores which extend into the area of the circumferential groove between the circular disks 26 which receives the radial bearing 27. Thus, these threaded bores may also be used for the refilling of lubricant if the respective screw 50 is unscrewed.

In order to loosen up compacted soil in the area of the tracks left by the traction vehicle or the tractor, loosening accessories 19, vertically adjustably by means of their holding stems 20, may be arranged at a transverse bar of the rotary device with dovetailing prongs 102. With a view to the construction of this device which is as short as possible and in view of the arrangement of this device closely behind the traction vehicle or tractor, the holding stems 20 are bent backward in the direction of the rotary device with dovetailing prongs 14, so that the loosening accessories 19 operate practically directly in front of the operating range of the rotary device with dovetailing prongs 14, and the soil thrown up by the loosening accessories 19, without any prior depositing on the ground surface, is drawn into the running rotary device with dovetailing prongs 14.

Figure 10:
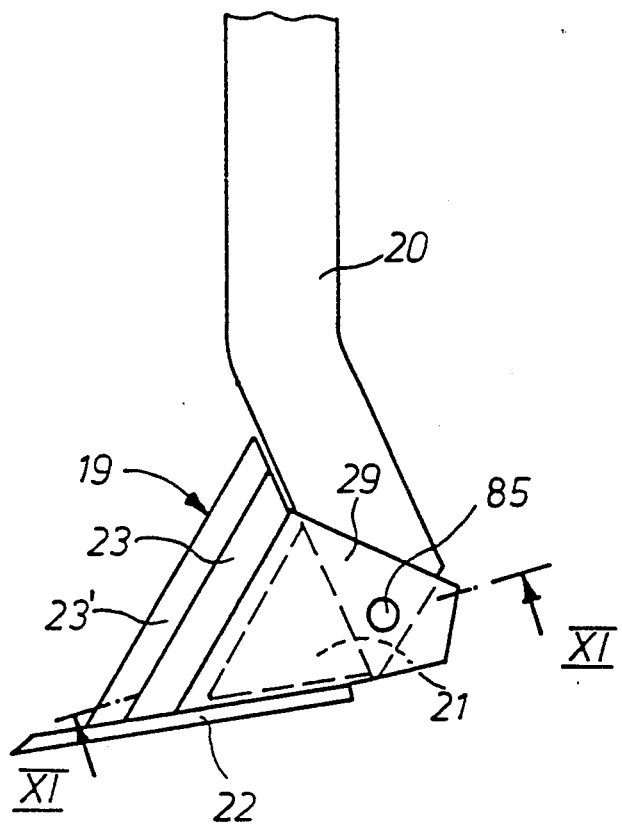
FIG. 10 is a lateral of the plow accessory arranged in front of the rotary device with dovetailing prongs used for loosening the soil.
Figure 11:
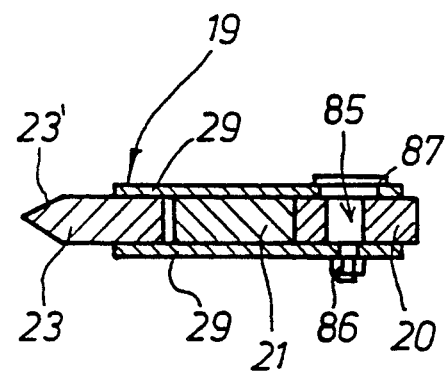
FIG. 11 is a sectional view of this accessory corresponding to the intersecting line XI—XI in FIG. 10.

The loosening accessories 19 are preferably provided in an exchangeable arrangement. For this purpose, according to FIGS. 10 and 11, a triangular extension 21 is arranged at the lower end of the respective holding stem 20 and points in driving direction. The loosening accessory 19 may be placed on this extension 21 in the manner of a shoe. In this case, the loosening accessory 19 has a lower chisel-type part 22 which is connected with a ledge-type part 23 to form an angular part enclosing the lower and the front edge of the extension 21. The front end of the chisel-type part projects slightly beyond the ledge-type part 23, which, in turn, at its edge pointing toward the front in driving direction, forms a wedge 23'. At both sides of the extension 21, triangle-type plates 29 are arranged at the loosening accessory 19, the front and lower edges of these plates being welded together with the ledge-type part 23 or the chisel-type part 22. An eccentric 85 is used for the captive holding of the loosening accessory 19 at the assigned holding stem 20, this eccentric 85 penetrating mutually overlapping bores in the triangle-type plates 29 as well as in the holding stem 20. By means of a corresponding rotation of the eccentric 85, the triangle-type plates 29 and thus the loosening accessory 19 are pulled in the direction of the rear side of the holding stem 20. Correspondingly, also in the case of possible manufacturing tolerances, a very firm and secure fit of the loosening accessory 19 at the holding stem 20 may be ensured. For the securing of the eccentric 85, a nut 86 is used which can be screwed onto a threaded part of this eccentric 85 and which makes it possible that the triangular plates 29 are braced between the nut 86 and the head 87 of the eccentric 85 against the holding stem 20.

Figure 8:
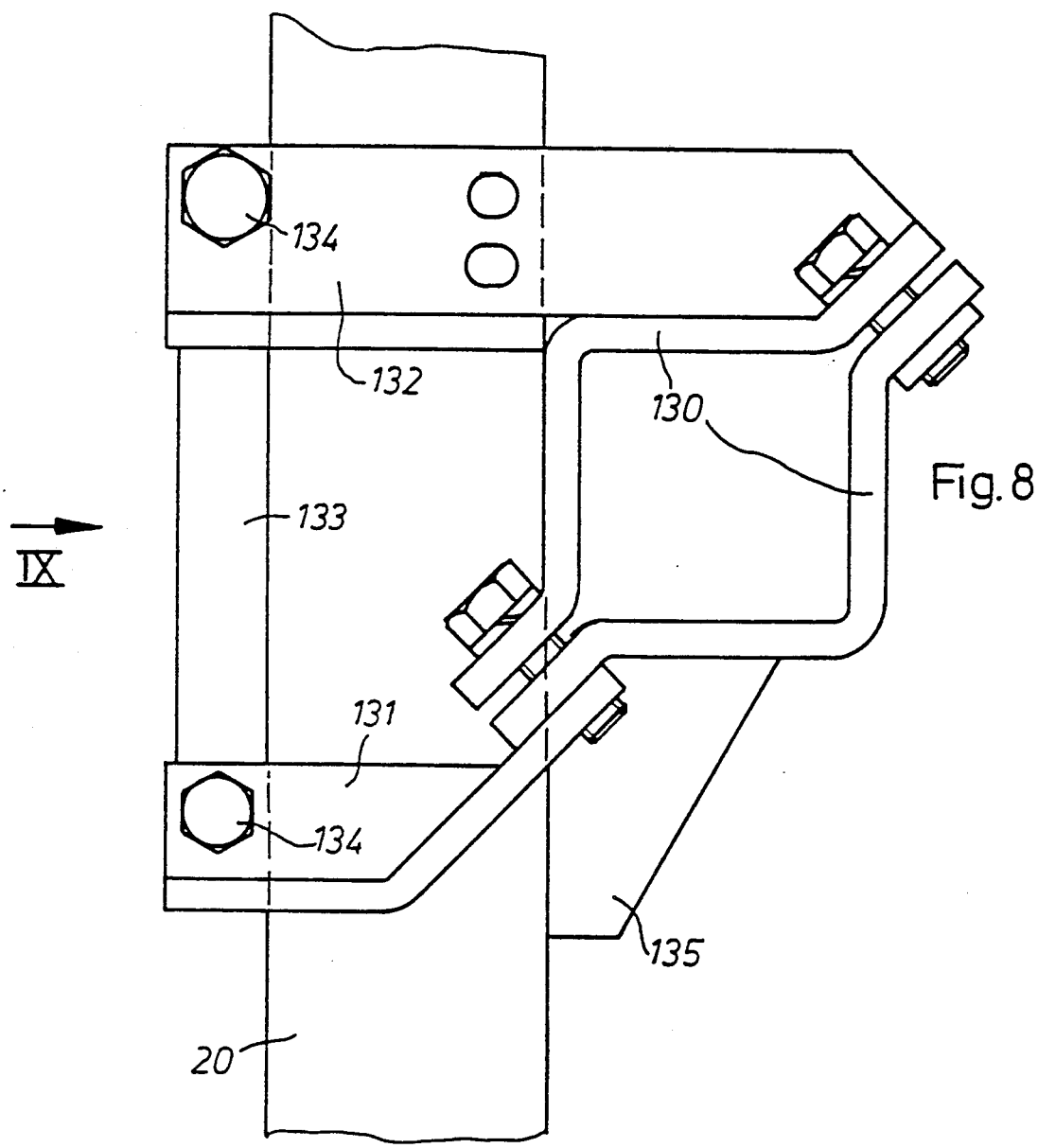
FIG. 8 is a lateral view of a holding device for the stems of the plow accessories operating in front of the rotary device with dovetailing prongs, which can be mounted at the frame of the rotary device with dovetailing prongs.
Figure 9:
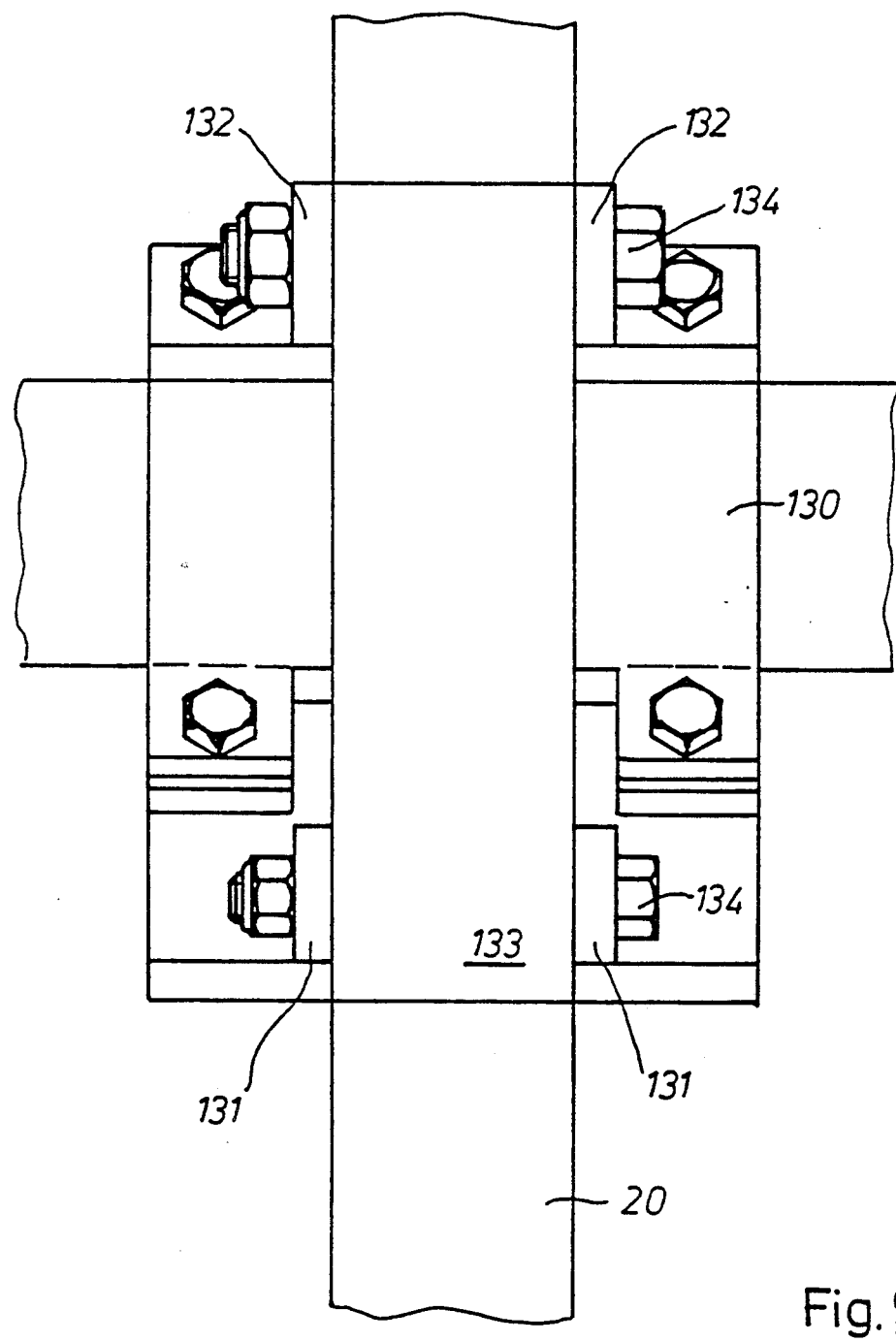
FIG. 9 is a frontal view of this holding device corresponding to arrow IX in FIG. 8.

For the fastening of the holding stems 20 of the loosening accessories 19, the arrangement shown in FIGS. 8 and 9 may preferably be used.

The transverse bar used for the fastening is embraced by two angle sections 130 which are screwed together in the manner of a clamp, in which case the screws penetrate tab-shaped extensions of the angle sections 130 arranged on both sides of the stem 20 to be fastened. On both sides of the stem, lower and upper guiding ledges 131 and 132 are in each case welded to the angle sections 130, the distance of these guiding ledges 131 and 132, in transverse direction of the machine, corresponding to the corresponding transverse dimensions of the holding stem 20.

On the side of the holding stem 20 facing away from the bar or the angle sections 130, a rod-shaped part 133 is detachably fastened, for example, by means of screw bolts 134, between the guiding ledges 131 and 132. By means of the guiding ledges 131 and 132 as well as the rod-shaped part 133 and the bars embraced by the angle sections 130, the holding stem 20 is enclosed in a tube shape so that it can be shifted only vertically. The respective vertical position may be secured by means of bolts or the like which are pushed into aligned openings in the upper guiding ledges 132 and in the holding stem 20. For a better support of the holding stem during soil preparation work, a lug-shaped extension 135 may also be welded to the lower angle section 130 in order to support the holding stem 20, on its side facing backwards in the direction of the apparatus, along a large vertical length.

The exchange of the holding stem 20 or of a loosening accessory 19 arranged on it is significantly facilitated by the fact that the rod-shaped part 133 can, in each case, be removed by means of the untightening of the screw bolt 134 so that the holding stem 20 between the guiding ledges 131 and 132 in FIG. 8 can be removed toward the left. The rotary device with dovetailing prongs 102 does not have to be moved vertically for this purpose.

If necessary, it is sufficient to unscrew only the lower screw bolts 134 for the demounting of the holding stems 20. Then, the holding stem 20, for the demounting, can be swivelled around a transverse axis of the device, in which case the area of the holding stem 20 which is the lower area in FIG. 8, moves toward the left. The holding stem 20 can then be pulled out toward the left in slantedly downward direction, without the necessity of having to lift the rotary device with dovetailing prongs 102.

The sowing machine shown in FIG. 3, among other characteristics, has the special characteristic that the pertaining bearing frame possesses sufficient stability in order to connect the sowing machine, as explained above, between the rotary device with dovetailing prongs 102 and the land roller or clod breaker apparatus 104. In this connection, the stability of the bearing frame of the sowing machine 102 is very significant because an equipment combination, which comprises a rotary device with dovetailing prongs 102 as well as a land roller or clod breaker apparatus 104, during ground preparation work, as a rule, is supported on the ground only by way of the roller. Correspondingly, the bearing frame of the sowing machine 103 which connects the rotary device with dovetailing prongs 102 with the land roller or clod breaker apparatus 104, must be able to withstand considerable stress.

For the case in which no sowing machine is available that has a sufficiently stable bearing frame, an arrangement corresponding to FIG. 6 is therefore provided for a combination consisting of the rotary device with dovetailing prongs 102 and the land roller or clod breaker apparatus 104 as well as the sowing machine 103. In this arrangement, as described above, the land roller or clod breaker apparatus 104, by means of an intermediate frame 7, is connected with the frame of the rotary device with dovetailing prongs 102.

If the bearing frame of the sowing machine 103 is sufficiently sturdy, an arrangement of the land roller or clod breaker apparatus 104 may be provided, in addition, at the sowing machine frame which can be swivelled upward, specifically in a manner which, in principle, is the same as explained above for an arrangement at the clod breaker apparatus 104 at the intermediate frame 7, in the case of an arrangement according to FIGS. 6 and 7 with the intermediate frame 7 between the rotary device with the dovetailing prongs 102 and the land roller or clod breaker apparatus 104.

Irrespective of whether the land roller or clod breaker apparatus 104 is arranged at the bearing frame of the sowing machine 103 so that it can be swivelled upward or cannot be swivelled upward, a curtain 16 is arranged at the bearing frame of the sowing machine 103 preferably in front of the roller which follows, as described above for an equipment combination according to FIGS. 6 and 7.

Another special characteristic of the sowing machine is the fact that the seed delivery pipes 10, in order to enlarge the passage cross-section existing between them for the soil, in lateral view of the machine, are arranged staggered behind one another in at least two rows, in which case seed delivery pipes, which follow one another in transverse direction of the machine, are housed alternately in one or the other row. In this case, the invention utilizes the recognition that a sufficiently large passage cross-section between the seed delivery pipes can also be produced when their line distance in transverse direction of the machine is narrow, because of the fact that in transverse direction narrowly spaced seed delivery pipes are arranged with a larger distance in longitudinal direction of the machine.

Preferably, the seed delivery pipes 10 are fixed at the bearing frame of the sowing machine 103, but, in principle, it is also possible to fix the seed delivery pipes 10 to other parts of the equipment system, for example, to the intermediate frame 7 between the rotary device with dovetailing prongs 102 and the land roller or clod breaker apparatus 104.

Figure 20:
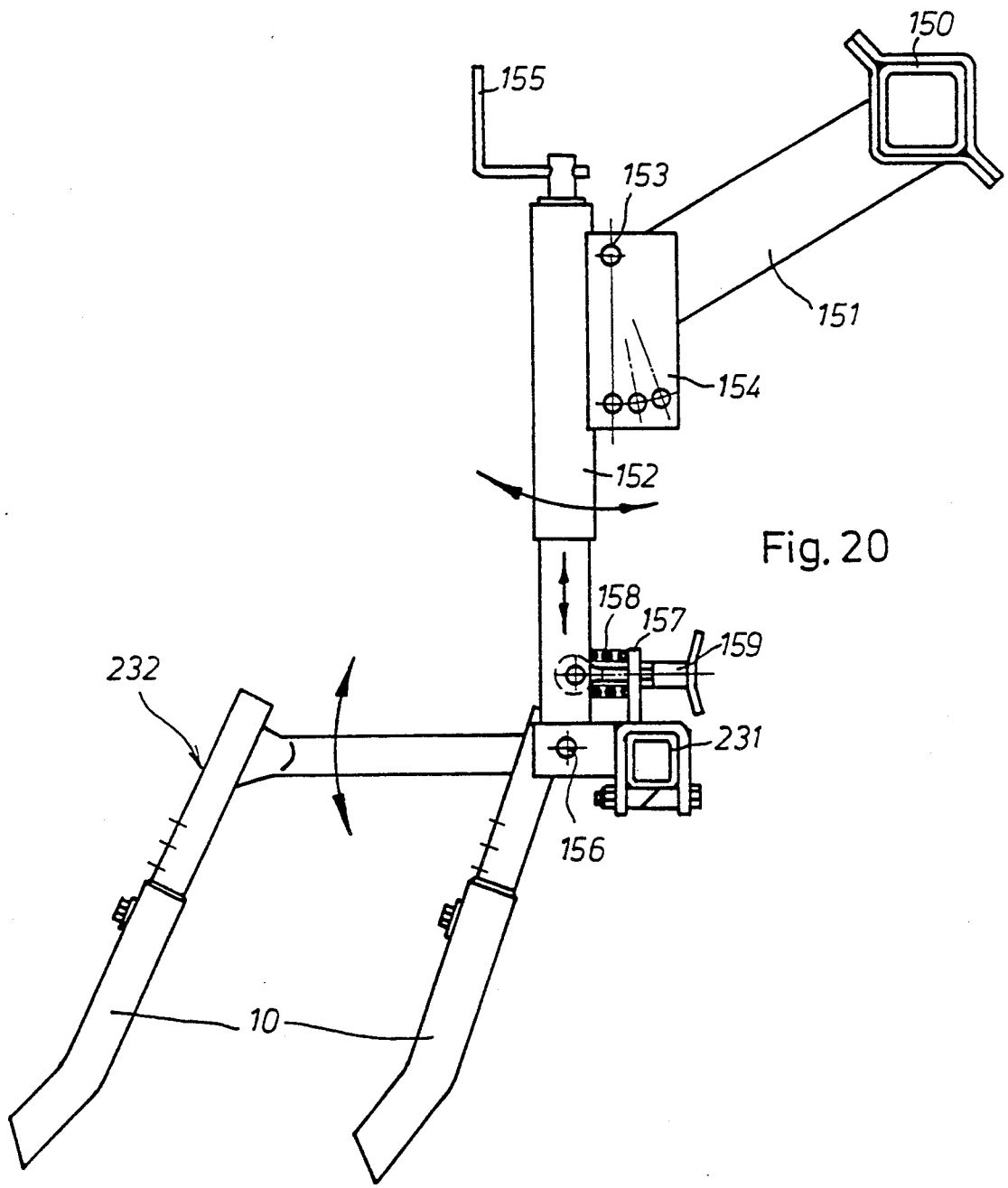
FIG. 20 is a lateral view of the seed delivery pipes as well as the pertaining holding and adjusting arrangement.
Figure 21:
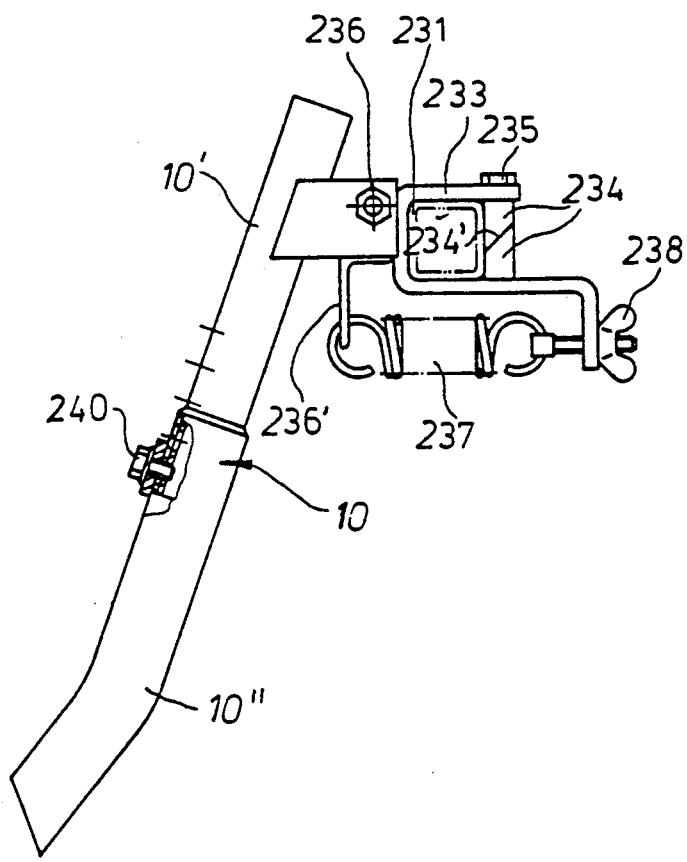
FIG. 21 is a lateral view of a seed delivery pipe which is in front in driving direction and is, pivotably against a spring force, held at a transverse bar.
Figure 22:
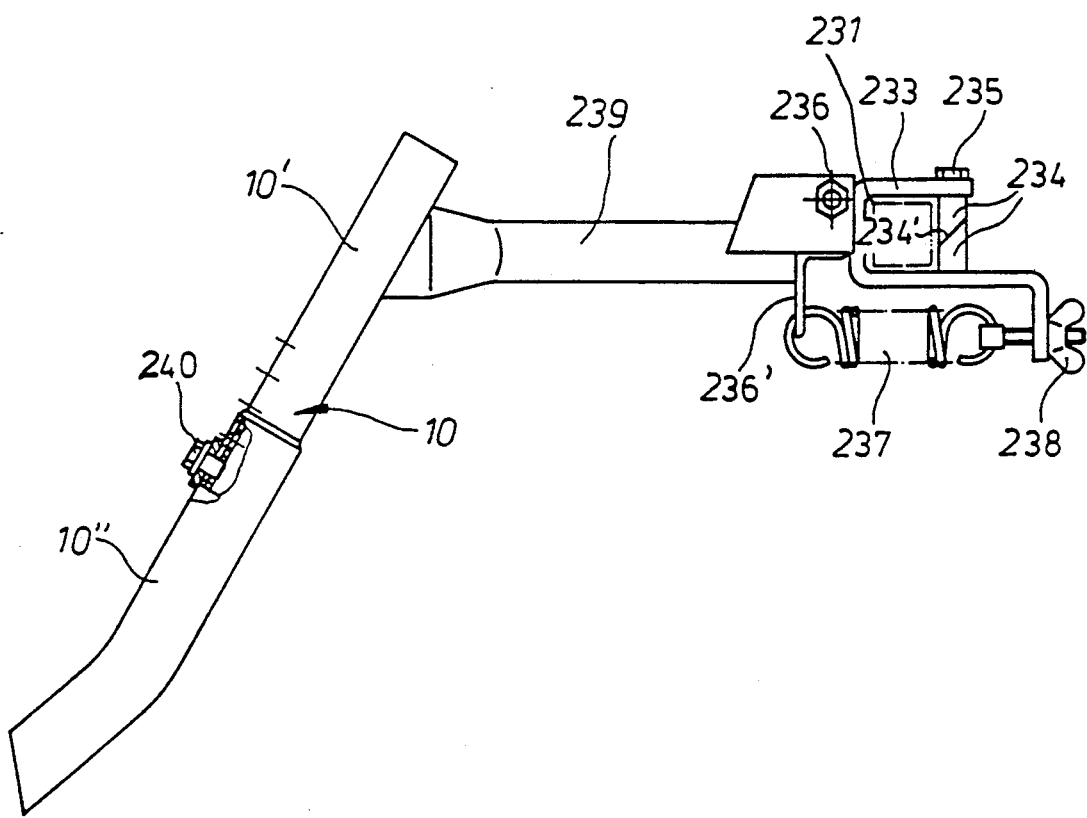
FIG. 22 is a representation corresponding to FIG. 21 of a seed delivery pipe which is in the rear in driving direction.

The construction of the seed delivery pipes 10 as well as their fixing is shown in detail in FIGS. 20 to 22.

Stirrups 233 which embrace the transverse bar 231 on three sides are arranged at the transverse bar 231. On the side of the transverse bar 231, which faces away from the central area of the stirrups 233, clamping pieces 234 are arranged at the U-legs of the stirrups 233 which are located opposite one another, which rest on one another with slanted surfaces 234' and are arranged such that they rest against the transverse bar 231. By means of screw bolts 235, the U-legs of the stirrups 233 as well as the clamping pieces 234 can be braced with respect to one another, one respective clamping piece 234 (in FIGS. 21 and 22, always the upper clamping piece 234) shifting with respect to the other clamping piece 234 against the transverse bar 231. This is based on the fact that the slanted surfaces 234', in longitudinal direction of the machine, are sloped with respect to a horizontal plane and correspondingly the mutually braced clamping pieces 234, when the slanted surfaces 234' slide on one another, are shifted in longitudinal direction of the machine in forward or backward direction. By means of the contact pressure of the respective one (upper) clamping piece 234 on the transverse bar 231, a particularly secure fit is ensured of the stirrups 233 on the transverse bar 231.

On the sides of the stirrups 233 which face away from the clamping pieces 234, the seed delivery pipes 10 are pivotably held by means of hinge-type joints 236, which have axes that extend in transverse direction of the machine. At the joint parts assigned to the seed delivery pipes 10, tab-shaped extensions 236' are arranged which project downward and which serve as a movable abutment of a helical tension spring 237, the other end of which is fastened to a downward-bent extension of one U-leg of the stirrups 233. In this case the tension of the helical tension springs 237 may be adjusted by means of adjusting screws 237.

In order to permit the arrangement of the seed delivery pipes 10 shown in FIG. 2, but also in FIGS. 6, 23, and 24, in two rows behind one another at the same transverse bar 231, one holding arm 239 respectively, in the case of the seed delivery pipes 232 which are in the rear in driving direction, is arranged at the joint part on the seed pipe side. If necessary, the holding arm 239 may be constructed to be telescopically adjustable in order to be able to vary the step distance between the seed delivery pipes 232 which are in front in driving direction and the seed delivery pipes 232 which are in the rear in driving direction. By means of the above-mentioned adjustability of the tension of the helical tension springs 237, it is ensured that comparable forces must affect the lower ends of the seed delivery pipes which are in front in driving direction as well as of those which are in the rear in driving direction, in order to deflect the seed delivery pipes 232 clockwise against the force of the springs 237 in FIGS. 21 and 22.

The transverse bar 231 carrying the seed delivery pipes 10 is preferably, in the manner shown in FIG. 20, fixed at a transverse bar of the bearing frame of the sowing machine 103 or of another part of the equipment system. Spindle units 152 or the like are arranged, pivotably around a transverse axis 153 of the machine, at the transverse bar 150 or at arms 171 which are arranged on it and which, in longitudinal direction, are normally directed toward the rear. The respective pivotal position of the spindle units may be determined by inserting bolts or the like in mutually corresponding openings of perforated disks 154 which, on one side, are fixedly arranged at the corresponding spindle unit 152 or the like and, on the other side, are fixedly arranged at the respective arm 151 or at the transverse bar 150.

By means of actuating the crank 155, the lower end of each spindle unit 152 may be moved out telescopically more or less far. At the lower ends of the spindle units 152, the transverse bar 231 is pivotable around a transverse axis 156, for example, by means of a hinge-type joint arrangement formed by flat parts. A corresponding adjusting device is provided for making it possible to adjust the respective swivelling position.

For this purpose, a helical compression spring 158 is clamped on in the example of FIG. 20 between a flat-strip-type arm 157 arranged at the transverse bar 231 and the lower vertically adjustable part of the spindle unit 152. This helical compression spring 158 braces the flat-strip-type arm 157 with respect to a nut 159 provided with a handle, this nut 159 being screwably-adjustably arranged on a threaded part which is hinged to the lower part of the respective spindle unit 152 and penetrates an opening in the flange-strip-type arm 157.

By means of the swivelling of the spindle units 152, the transverse bar 231 and therefore the seed delivery pipes 10, in longitudinal direction of the machine, may be pushed toward the rear or the front. By means of the cranks 155 of the spindle units 152, the height of the seed delivery pipes 232 may be changed rapidly. The adjustment of the nuts 159 provides the possibility of adjusting the height of the seed delivery pipes 232, which are in the rear in driving direction (in FIG. 20, the left seed delivery pipes) relative to the front seed delivery pipes 232. In this manner, it can be ensured under all circumstances that the seed coming out of the front and the rear seed delivery pipes 232 is covered evenly with soil, particularly when the rotary device with dovetailing prongs 102 operates in front of the seed delivery pipes 232. An adaptation to the shape of the stream of soil thrown backward by the rotary device with dovetailing prongs which passes through between the seed delivery pipes 232 is therefore possible in any manner.

If, when the traction vehicle or tractor drives backwards, the seed delivery pipes 10 come in contact with the ground, a larger flexibility is ensured by means of the helical compression springs 158; i.e., as a rule, defects may be avoided.

In principle, other elements may also be arranged for the adjustment of the transverse bar 231 in longitudinal direction of the machine and in vertical direction. However, the arrangement according to FIG. 20 distinguishes itself by its particularly simple operatability.

The seed delivery pipes 10 are constructed in two parts, in which case, a respective upper pipe piece 10' is pivotably held at the stirrups 233. The respective lower pipe piece 10" is telescopically slidably arranged on the upper piece piece 10' and may be fixed to the upper pipe piece 10' by means of locking screws 240. Thus, on the one hand, it is possible to adjust the height of the lower ends of the seed delivery pipes 10 and, on the other hand, if necessary, lower pipe pieces 10" of a different shape may be arranged or sowing plows fitting on the upper pipe pieces 10'.

In the shown embodiments, the seed delivery pipes 10 are each arranged singly. In principle, double pipe arrangements are also possible, one pipe being used for the delivery of the seed, and the other pipe being used for the delivery of fertilizers or the like. In order to avoid that strands of plants or the like adhere to the delivery pipes constructed in the shape of a double pipe, one pipe part of the double pipe, in driving direction, is arranged behind the other pipe part.

We claim:

1. An equipment system for agricultural ground soil preparation, comprising:
    a vertically adjustable frame unit, having a trestle-type frame part including a bearing frame for coupling the frame unit to a traction vehicle by a lifting rod assembly or a three-point rod assembly and including a supporting frame, the trestle-type frame part being fixedly arranged at an undercarriage with support wheels;
    a rotary device with dovetailing prongs, driven by a power take-off shaft, for producing a soil stream, having a bearing frame with receiving parts for coupling the rotary device to the frame unit, wherein the bearing frame of the rotary device is locked without play in all directions with respect to the frame unit;
    a sowing machine with vertically adjustable seed delivery pipes adapted to be mounted behind one another in two rows which follow one another in transverse direction, for delivering seeds into the soil stream produced by the rotary device, having a bearing frame adapted for mounting behind the rotary device, and also being adapted for mounting to the bearing frame of the frame unit;
    a clod breaker, having a bearing frame which is adapted to be mounted on either the bearing frame of the frame unit, the bearing frame of the rotary device via separate connecting points on the bearing frame of rotary device, or on the bearing frame of the sowing machine, and which can be pivotably adjusted around a transverse axis;
    vertically adjustable plow accessories, adapted to be mounted on the undercarriage of the frame unit or in front of the rotary device; and
    a mat-type curtain for guiding the soil stream to the ground behind the seed delivery pipes.

2. An equipment system according to claim 1, wherein the clod breaker can be mounted at an intermediate platform-like frame which extends in backward direction from the frame of the rotary device.

3. An equipment system according to claim 1, wherein the clod breaker is adapted to be coupled to the frame of the undercarriage.

4. An equipment system according to claim 1, wherein the wheels of the undercarriage are attached via an axle unit which employs a longitudinal rocker device to pivotably mount the axle unit around a transverse axis, at the frame of the undercarriage, the axle unit being vertically adjustably supported by support means including a spindle unit, which is adapted to be inserted between the axle unit and the frame of the undercarriage away from the transverse axis.

5. An equipment system according to claim 4, wherein the frame of the clod breaker is a longitudinal rocker device adapted to be mounted at connecting parts provided for the axle unit, pivotably around the same transverse axis, at the frame of the undercarriage, and is adapted to be supported by the spindle unit.

6. An equipment system according to claim 1, wherein a pulley is provided at the undercarriage which can be driven by the power take-off shaft for driving the sowing machine, mounted on the undercarriage.

7. An equipment system according to claim 1, wherein a flap is arranged behind the rotary device, the flap being connected to an upper rotor casing and pivotably adjusted around a transverse axis, the flap delimiting, in upward direction, the clearance for the soil thrown backward by the rotor.

8. An equipment system according to claim 7, wherein at the free end of the flap, a flexible mat is arranged, which is a continuation of the flap and which has approximately the same dimensions as the flap.

9. An equipment system according to claim 1, wherein the plow having holding stems, is vertically adjustably arranged in holding devices which surround the stems in a ring shape and which can be laterally opened in such a manner that the stems can be taken out of the holding devices transversely to their axis.

10. An equipment system according to claim 1, wherein the seed delivery pipes are constructed as a telescope, a lower end piece being fixable on or in an upper segment of the respective seed delivery pipe in differently shifted positions.

11. An equipment system according to claim 1, wherein the seed delivery pipes which are adapted to be swivelled in longitudinal direction of the machine are mounted at a transverse bar by means of clip-type holding devices which can be adjusted in a transverse direction and which, by means of stirrups, embrace the transverse bar in a U-shape wherein on the side of the transverse bar, facing away from the center piece of the stirrups, the clamping pieces have slanted surfaces resting on one another such that one clamping piece, when the U-legs are braced against one another, is pressed against the bar.

12. An equipment system according to claim 1, wherein the seed delivery pipes are held behind one another jointly at a frame or at a transverse bar, which is adapted to be adjusted vertically or longitudinally of the machine while swivelling around its axis.

13. An equipment system according to claim 1, wherein a transmission of the rotary device with dovetailing prongs, which can be connected with the power take-off shaft, has an additional power take-off for a pulley for driving a sowing machine which can be mounted on the rotary device with dovetailing prongs.

* * * * *